(12) United States Patent
Park et al.

(10) Patent No.: US 7,565,821 B2
(45) Date of Patent: Jul. 28, 2009

(54) SPACER FABRIC AND METHOD OF FABRICATING THE SAME

(75) Inventors: Pyung-Yul Park, Kimcheon-shi (KR); Sang-Min Nah, Kunpo-shi (KR); Jong-Hyun Hwang, Gumi-shi (KR)

(73) Assignee: Kolon Glotech, Inc. (KR)

( * ) Notice: Subject to any disclaimer, the term of this patent is extended or adjusted under 35 U.S.C. 154(b) by 290 days.

(21) Appl. No.: 11/648,945

(22) Filed: Jan. 3, 2007

(65) Prior Publication Data
US 2008/0006060 A1     Jan. 10, 2008

Related U.S. Application Data

(60) Provisional application No. 60/819,083, filed on Jul. 7, 2006.

(30) Foreign Application Priority Data

Dec. 28, 2006 (KR) ............... PCT/KR2006/005828

(51) Int. Cl.
  *D04B 21/08* (2006.01)
(52) U.S. Cl. ............................................ 66/195
(58) Field of Classification Search ............ 66/190, 66/191, 192, 193, 195, 196, 169 R, 170; 442/312–318
  See application file for complete search history.

(56) References Cited

U.S. PATENT DOCUMENTS

| | | | | |
|---|---|---|---|---|
| 5,166,480 A | * | 11/1992 | Bottger et al. | 181/292 |
| 5,385,036 A | * | 1/1995 | Spillane et al. | 66/87 |
| 5,651,847 A | | 7/1997 | Loeffler | |
| 6,105,401 A | * | 8/2000 | Chadeyron et al. | 66/195 |
| 6,644,070 B2 | * | 11/2003 | Ikenaga et al. | 66/196 |
| 7,213,421 B2 | * | 5/2007 | Shirasaki et al. | 66/193 |
| 7,240,522 B2 | * | 7/2007 | Kondou et al. | 66/195 |
| 2002/0157429 A1 | * | 10/2002 | Matsumoto | 66/195 |

FOREIGN PATENT DOCUMENTS

| | | |
|---|---|---|
| KR | 20-2001-0000522 | 1/2001 |
| WO | 2005105516 A2 | 11/2005 |
| WO | 2006027794 A3 | 3/2006 |

OTHER PUBLICATIONS

Wilkens, C., "Two needle bar fabrics double face fabrics," Warp Knit Fabric Construction, Heusenstamm 1994, pp. 134-142.
Polymeric Materials Research Team, Hyundai/KIA Motors 6th Edition, Knitted Fabric for Seat Covering, Material Specification.

* cited by examiner

*Primary Examiner*—Danny Worrell
(74) *Attorney, Agent, or Firm*—Mills & Onellp LLP

(57) ABSTRACT

The present invention relates to a spacer fabric with advanced cushionability, flexibility, and thermal conductivity, and a method of fabricating the same. In accordance with the present invention, the spacer fabric is useful as a car seat fabric. In particular, the spacer fabric is applicable to a car seat equipped with an actuator and a heating/cooling apparatus inside, due to the advanced flexibility for transferring the actuator moving effect to the body, the increased cushionability for minimizing the hardness of the surface of the device, and the high thermal conductivity for effectively transferring the quick heating/cooling effect to the body.

26 Claims, 10 Drawing Sheets

SPACER FABRIC AND METHOD OF FABRICATING THE SAME

CROSS REFERENCE TO RELATED APPLICATION

This application claims priority to and the benefit of Provisional Patent Application No. 60/819,083 filed on Jul. 7, 2006, and PCT Application No. PCT/KR2006/005828 filed on Dec. 28, 2006, which are hereby incorporated by reference for all purposes as if fully set forth herein.

FIELD OF THE INVENTION

The present invention relates to spacer fabrics, and more specifically to a spacer fabric with advanced cushionability, flexibility, and thermal conductivity, and a method of fabricating the same.

BACKGROUND OF THE INVENTION

Recently, various kinds of fabric and production technologies have been applied in the field of car seat fabric industry. These fabrics include knitting cloths, such as warp knitting fabrics including Double Raschel (D/R) fabric, Tricot Cut (T/C) fabric, and the like, and weft knitting fabrics including Circular Knit (C/K) fabric, Sinker Pile (S/P) fabric and the like; and weaving cloths such as Flat Woven (F/W) fabric, Moquette (M/Q) fabric, and the like. The technology for producing the fabrics are well known and commonly used in the relevant art. These fabrics can be then sub-classified diversely according to shape, design, and production methods thereof, and therefore the classification of car seat fabrics is extremely diverse.

FIG. 7 shows the structure and formation principle of D/R fabric. Referring to FIG. 7, the D/R fabric is composed of two ground faces, and each ground consists of a front face and a back face. When such a structure is formed, vertical pile yarns are created between ground faces simultaneously with the formation of the grounds. Raw fabrics of the D/R fabric are produced by slitting the center of the pile yarns using a center-cutting knife, as shown in FIG. 7. As a car seat covering cloth, the D/R fabric has some advantages in that it is nice to touch, its stretchability can be controlled, and it is high in quality level. However, it has disadvantages such as difficulties in pattern expression and high costs.

FIG. 8 shows the structure and formation principle of T/C fabric.

Referring to FIG. 8, the T/C fabric is knitted with one ground face that is immediately piled to create pile yarns. The knitted pile yarns are pulled to form long pile yarns, and then, the pulled pile yarns are cut to form final pile yarns. Finally, the surfaces of the pile yarns are subjected to finishing treatments to complete the T/C fabric as shown in FIG. 8. As a car seat covering cloth, the T/C fabric has advantages such as easiness in pattern expression, high stretchability, and low costs compared to its quality. However, it has disadvantages such as the lack of external attractiveness in appearance and roughness to touch.

FIG. 9 shows the structure and formation principle of F/W fabric.

Referring to FIG. 9, the F/W fabric is fabricated through continuous repeat intersection of the warp yarn and the weft yarn. The F/W fabric can be divided into two types as follows: a Dobby fabric having a single repeat intersection, and a Jacquard fabric having numerous single structures combined to form a double or a multiple structure. As a car seat covering cloth, the F/W fabric has advantages such as ease of pattern expression, relatively low weight, and ease of control and treatment. However it has disadvantages such as its not-so-attractive external appearance, harsh textural feel, and low stretchability.

FIG. 10 shows the structure and formation principle of C/K fabric. As a weft knitting cloth, the C/K fabric is formed through loops on the surface of raw material, where knitting is progressed horizontally. In this case, a pile is formed through loop cutting, and the surface of the pile is then uniformly treated during the shearing process. Advantages of the C/K fabric lie in the ease of pattern expression and superior stretchability. However, it also has disadvantages such as an easiness to be frayed and weak tenacity.

Among the fabrics, weft knitted fabrics such as the C/K fabric and the S/P fabric are useful in respect of flexibility, warp knitted fabrics such as the D/R fabric and the T/C fabric are useful in respect of softness and cushionability, and weaved fabrics such as the F/W fabric and the M/Q fabric are useful in respect of thermal conductivity.

Meanwhile, the term 'seat' may be defined as an instrument with the purpose of supporting the human body. A car seat means, in a narrow sense, a seat for an automobile, and in a broad sense, a seat for all moving vehicles. Therefore, a car seat is essentially differentiated from a general chair because it is continuously exposed to vibration and directly related to driving safety.

The following are some of the most important requisites of an automotive seat.

1. It must be safe enough to be an instrument within a moving vehicle.
2. It must be comfortable.
3. It must have various convenient functions.
4. It must be nice appearance-wise.
5. It must be economically efficient.

There have been many researches to develop a seat with such safety, comfort, convenience, elegant appearance, and economic efficiency.

Safety is a crucial and indispensable requirement for a seat. Drivers today are demanding not only initial comfort, but also a more comprehensive fatigue-reduction during long distance driving. In addition, recently, aesthetic factors such as color and shape of the seat itself have been considerably increased as well. Now, a car seat covering serves as not only a piece of cloth covering up the seat, but also a major functional part of the car seat in providing the comfort and enjoyment, as well as aesthetic satisfaction demanded by customers.

From now on, a more accurate design technology is needed with regards to the field of human engineering, considering the driver's conditions in contact with the atmospheric temperature and environment. Development of car seat fabric is a part of this change under the motto of future technology growth, and it is now the time to add even more additional factors in technological development. In order to satisfy such requirements, it is required to develop a seat cover fabric with advanced flexibility, cushionability, and thermal conductivity as described above. However, such a fabric has not been developed yet since the development of such fabric requires high-level techniques that cannot be achieved by conventional techniques.

SUMMARY OF THE INVENTION

Some embodiments of the present invention provide a spacer fabric with advanced flexibility, cushionability, and thermal conductivity, comprising a top layer and a bottom layer formed by knitting Latent Self Crimping Yarn (LSCY)

and Draw Textured Yarn (DTY), and multiple pile yarns formed between the top and bottom layers linking the two layers. In this case, the LSCY is a side-by-side yarn containing one component or the combination of two components selected from the group consisting of polyethyleneterephthalate (PET), polytrimethyleneterephthalate (PTT), polybutyleneterephthalate (PBT), and nylon; the DTY is prepared by drawing polyester or nylon filament yarn; the LSCY and DTY have a diameter of 75 to 400 Denier; and the pile yarn is a monofilament made of a component selected from the group consisting of polyester, nylon, acryl, metallic yarns, and carbon fibers, and having a diameter of 20 to 50 Denier.

Another embodiment of the present invention provides a method of preparing a spacer fabric with advanced flexibility, cushionability, and thermal conductivity, comprising: forming a top layer and a bottom layer by knitting Latent Self Crimping Yarn (LSCY) and Draw Textured Yarn (DTY), wherein the LSCY is a side-by-side yarn prepared by conjugated spinning using one or two components selected from the group consisting of polyethyleneterephthalate (PET), polytrimethyleneterephthalate (PTT), polybutyleneterephthalate (PBT), and nylon, and has a diameter of 75 to 400 Denier, and the DTY is prepared by drawing polyester or nylon filament yarn and has a diameter of 75 to 400 Denier; forming multiple pile yarns between the top and bottom layers linking the two layers, wherein the pile yarn is a monofilament made of a component selected from the group consisting of polyester, nylon, acryl, metallic yarns, and carbon fibers, and having a diameter of 20 to 50 Denier; and performing the finishing steps comprising a stabilizing step, a presetting step, a dyeing step, a final setting step, and a resin treatment step.

Still another embodiment of the present invention provides a car seat fabricated using the spacer fabric, wherein the car seat may contain an actuator having a moving effect and a heat transfer device such as a transfer electron device (TED).

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention. In the drawings.

DETAILED DESCRIPTION OF THE PREFERRED EMBODIMENTS

Figure 1:
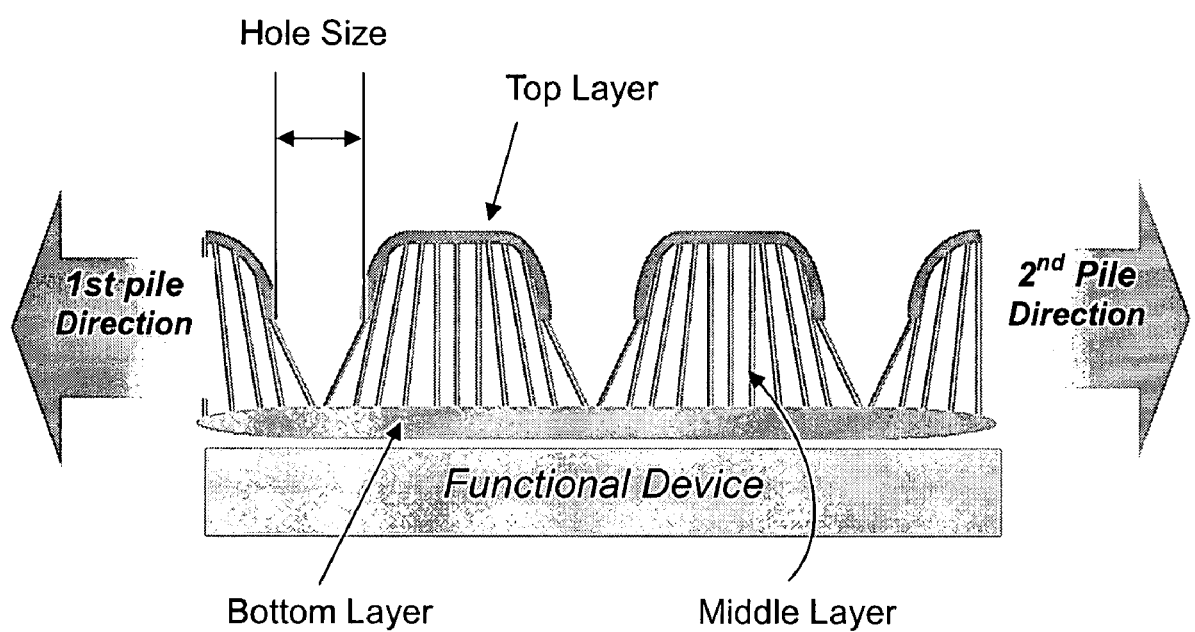
FIG. 1 is a schematic view showing the structure of a spacer fabric according to the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the invention to those skilled in the art. Like numerals refer to like elements throughout the specification.

Exemplary embodiments of the present invention will hereinafter be described in detail with reference to the accompanying drawings.

Herein, the term 'car seat' is used in a broad sense, that is, it means an instrument with the purpose of supporting the human body setting in all moving vehicles. As aforementioned, the object of the present invention is to provide a car seat with an advanced high-performance. In particular, it may be achieved by the present invention to provide drivers with a comfortable environment through maintenance of proper temperature levels on seat surfaces and with massaging effects for long distance driving. This is an extremely difficult, multi-functional technology, which is considerably upgraded in comparison with the conventional techniques. The device exhibiting such effects is to be installed underneath the fabric material of the car seat and therefore has indirect effects on the driver. In other words, the fabric acts as an intermediary material with the role of transmitting the abilities of the device to the driver in a more smooth, efficient, and safe manner.

The characteristics required for the car seat include the following: 1) stretchiness to aid the operation of the pusher connected to the SMA actuator; 2) softness of the cushions to decrease discomfort factors caused by the stiffness of the Peltier's device; and 3) high thermal conductivity to raise the thermal efficiency by more rapidly heating and cooling.

The present inventors found, through various tests to prepare a car seat fabric having the above three characteristics of flexibility, cushionability, and thermal conductivity, that a fabric material that satisfies the above characteristics is a spacer-type fabric prepared with Latent Self Crimping Yarn (LSCY), Draw Textured Yarn (DTY), and monofilament yarns, to complete the present invention.

The main goal of the present invention is to develop a seat fabric capable of maximizing the exhibition of the effects provided by actuator technologies.

The actuator technologies may be broadly divided in two classes. One would be the Transfer Electron Device (TED) technology that effectively reduces the adverse effects of the extreme surroundings of heat in summer or cold in winter. The other is the technology regarding the movement of the actuator that creates a massaging effect, soothing the driver's pain in the hip and thighs caused by long distance driving, to provide comfort to drivers. The effects of the actuator technology can be transferred to the drivers essentially passing through the seat fabric, thereby requiring the development of the optimal car seat fabric.

As mentioned above, the mainly required properties of the car seat fabric to achieve the above objects are as follow.

1. Obtainment of flexibility for effective transmission of the actuator movement.

2. Obtainment of cushionability for minimizing the hardness of the device surface.

3. Obtainment of high thermal conductivity for quick transfer of the cooling/heating performance of the TED.

The achievement of these three major properties is the major topic of the present invention.

The flexibility plays a role of transferring the massaging movement of the actuator to the human body. Here, if both vertical and horizontal stretchabilities are not achieved, the individual performance of the motion would be reduced, and thereby it is possible that the efficiency of the sectionalizing program (the movement order, the movement program, etc.) may be reduced. The quantitative capability for flexibility can be verified through such testing methodologies as elongation at specified loads and the elongation set.

The actuator is generally located beneath the seat cloth for exhibiting the two major functions, which, however, may cause some discomfort to the driver. In other words, the driver may feel the stiffness of the device causing the driver to suffer. In order to overcome such a problem, it is necessary to give cushionability to the car seat fabric. Here, it should be noted that the cushionability should be exhibited by the performance of the car seat fabric itself without additional sponge support for the reasons as follow. In existing seat fabrics, the sponge is laminated onto the back in order to increase comfort and fix the form of the fabric. However, this sponge is a PU foam, which is a polymer material with the ability of self-maintenance against heat through latent heat. It could potentially cause a hindrance to the goal of 'quick response', and in order to solve this problem, it is necessary to develop a cushion force within the seat cloth itself. The cushion force is measured by the ability to recover quickly from compression and through physical softness.

Thermal conductivity is the quantitative measurement of how effectively heat/cold is transferred from the source to the target, and supports the performance exhibition of the quick cooling and heating, which is one of the major goals of this invention. Here, the thermal conductivity and air permeability are relatively compared in order to measure each other. In addition, as other main factors of the fabric, the abrasion resistance and the color fastness of common polyester yarn and polytrimethyleneterephthalate (PTT) may be also considered as important properties for the present fabric.

In order to achieve the above requirements, the present invention provides a spacer fabric with advanced flexibility, cushionability, and thermal conductivity, including a top layer and a bottom layer formed by knitting Latent Self Crimping Yarn (LSCY) and Draw Textured Yarn (DTY), and multiple pile yarns formed between the top and bottom layers that links the two layers (See FIG. 1).

In another aspect, the present invention provides a method of preparing the spacer fabric with advanced flexibility, cushionability, and thermal conductivity, including:

knitting LSCY and DTY to form a top layer and a bottom layer;

forming multiple pile yarns using monofilament yarns between the top and bottom layers that link the two layers; and performing finishing processes including a stabilizing step, a pre-setting step, a dyeing step, a final setting step, and a resin treatment step.

Hereinafter, the present invention will be described in detail. In the present invention, among the F/W fabric, the C/K fabric, the T/C fabric, the D/R fabric, the D/R crease fabric, and the spacer fabric, the spacer fabric is found to have superior tensile, elongation, extension, thermal conductivity, and air permeability properties. Therefore, the present invention provides a spacer fabric type fabric.

The LSCY is a material having the characteristic that a crimping property is exhibited by a thermal treatment after processing, while it is not exhibited prior to the processing. Therefore, the LSCY provides flexibility to the prepared fabric. In particular, the LSCY prepared by conjugated spinning in the form of two components side-by-side may have more superior flexibility through the crystal orientation control. The LSCY may be a side-by-side yarn containing one component or the combination of two components selected from the group consisting of polyethyleneterephthalate (PET), polytrimethyleneterephthalate (PTT), polybutyleneterephthalate (PBT), and nylon. When the combination of two components is used, the combination ratio may vary depending on the use and the desired property of the prepared fabric, and be preferably 1:2 to 2:1 by weight.

In some embodiments, the LSCY may be a side-by-side yarn prepared by conjugated spinning using one component with mixing an orientation restrainer to only one side. The orientation restrainer may unlimitedly include all materials conventionally used to control the orientation degree, and for example, may be selected from the group consisting of poly methyl metacrylate (PMMA), methyl metacrylate (MMA), poly ethylene (PE), poly propylene (PP), and the like. The amount of the orientation restrainer used is preferably 0.01 to 10 wt %. In another preferable embodiment, the LSCY may be a side-by-side yarn prepared by conjugated spinning using two components having different peculiar viscosity and shrinkage, such as PET and PTT. The peculiar viscosities of PET and PTT may be 0.5 to 0.7 cps and 0.9 to 1.1 cps, respectively, and the difference of shrinkage therebetween may be 30 to 70%. The same substances having the different peculiar viscosity and shrinkage may also be used. When the LSCY is prepared using an orientation restrainer to only one side, or the combination of two components having the different peculiar viscosity and shrinkage, more superior flexibility may be obtained through controlling the orientation degree.

In order to achieve a desired property of the prepared fabric, the molecular weight of the polymers used as components of the LSCY may be preferably 10,000 to 20,000 in the case of a low-viscosity polymer, and 25,000 to 50,000 in the case of a high-viscosity polymer, but not limited thereto.

The DTY may be prepared by drawing a polyester or nylon filament to generate twists, and thereby obtaining advanced flexibility, softness, and touch feeling. In order to achieve such advanced flexibility and touch feeling, the DTY may be prepared by drawing polyester pre-oriented yarn (POY), double twisting two or more folds of the obtained drawn yarn at the twist ratio of 10Z to 50Z, first heating the twisted yarn at 180 to 200° C., and second heating the first heated yarn at 190 to 210° C.

As demonstrated in the examples of the present invention, to realize the advanced flexibility and touch feeling, the weight ratio between the LSCY and the DTY may be preferably 1:0.75 to 2 (LSCY weight:DTY weight). In addition, when holes are expressed on the fabric surface, the LSCY should secure a proper space during a heat-setting process, and for this purpose, the DTY that functions as a support in texture is necessary to be mixed at a proper portion. Therefore, considering the above, it is preferable to settle the ratio between the LSCY and the DTY to the above range.

The diameters of the LSCY and the DTY are also important factors that affect the structure and the property of the fabric to be prepared. Therefore, to achieve the properties required for the fabric according to the present invention, the diameters of the LSCY and the DTY are preferably 75 to 400 Denier, and more preferably, 180 to 350 Denier. Since the fabric is necessary to secure a minimal volume to satisfy the requirements of flexibility and compression recovery required for the car seat cloth, it is preferable to settle the diameters of the LSCY and the DTY to the above range. When the diameters of the LSCY and the DTY are greater than 400 Denier, it is impossible to weave a spacer fabric.

In another embodiment, the top and the bottom layers may have holes having a proper size, leading to more improved flexibility (extension), air permeability, recovery, and thermo conductivity of the fabric. To obtain optimal thermal conductivity, extension, and recovery of the fabric, the advantageous hole diameter is preferably 3 to 5 mm, the ratio of machine direction (MD), i.e., a weaving direction, to across machine direction (AMD), i.e., a vertical direction to the weaving direction, of the hole size is preferably 1 to 1.5, and more preferably 1, leading to a circular shape. The holes may be formed on only the top layer, or both of the top and bottom layers. In the preferable embodiment of the present invention, it is revealed that the sensitivity of the thermal conductivity obtained by variation of AMD holes is higher than that by variation of MD holes by about 2 times. In other words, it is more effective to control the conditions for thermal conductivity by variation of the AMD holes size than by variation of the MD holes size.

In the present invention, the fabric is in the form of a spacer fabric having multiple pile yarns between the top and the bottom layers. The pile yarns link the top and the bottom layers, and thereby a proper space is obtained therebetween, contributing to thermal conductivity and cushionability, and the two layers are mechanically supported and balanced, contributing in shapeability and flexibility as well. Therefore, in the pile yarn, rigidity and recovery should be basically secured. For this reason, the pile yarn should be made of a proper material and have a proper diameter. The pile yarn may be prepared using a monofilament yarn made of a component selected from the group consisting of polyester, nylon, acryl, and conductive yarns including metallic yarns and carbon fibers.

In another embodiment, it is revealed that, when the monofilament consisting in the pile yarn has the diameter of 20 to 50 Denier, a considerably high elasticity (recovery) can be achieved. Therefore, it is preferable that the diameter of the monofilament consisting in the pile yarn is 20 to 50 Denier, and more preferably 30 Denier.

The structures created by the pile yarns linking the top and the bottom layers include a straight pattern, a cross pattern, and a semi-cross pattern (See FIG. 1). The straight pattern is a structure knitted on the same wale, the cross pattern is a structure knitted by moving 2 wales, and the semi-cross pattern is a structure knitted by moving one wale. In accordance with an embodiment of the present invention, it is found that the semi-cross pattern has a higher pile height, elasticity, and compression recovery force than the others, and therefore, the semi-cross pattern may be preferably employed in the present invention. More preferably, the pile yarn may be in the semi-cross pattern having the pile structure forming coordinates of 21100112 and 01122110.

The content of the pile yarns for the weights of the LSCY and the DTY may be preferably 1:0.75 to 2:0.5 to 1.5 (LSCY weight:DTY weight:pile yarn weight).

The thickness of the spacer fabric may be determined by the pile height, which may be controlled by the machine (M/C) plate distance in the initial state, where, as the pile height becomes higher, the compression recovery force becomes lower. To satisfy both of the preferable pile height and the compression recovery ratio, the M/C plate distance is necessary to be controlled to a proper range. Considering this matter, the M/C plate distance may be 7 to 9 mm, and preferably, 8 mm (See FIG. 6).

In the preparation method according to the present invention, the finishing step provides final properties to the spacer fabric, the shape thereof is created in the above knitting process, and may include a stabilizing step, a pre-setting step, a dyeing step, a final setting step, and a resin treatment step.

The stabilization step is to secure a proper space for the flexible expression of the yarns by smoothly enlarging the spacer fabric within optimal conditions, thereby obtaining flexibility of the fabric. Therefore, the key of the process is the enlargement of the fabric within optimal conditions. That is, the stabilization step is a process for the purpose of improving the stretch capability of the fabric. For this purpose, the stabilization step may be performed under the conditions of a reaction temperature of 100 to 140° C., an enlargement rate of 15 to 25 m/min, and a fabric width enlargement of 5 to 10%.

The pre-setting process is a heat treatment step, which provides a smooth dyeing process by fixing the shape of the fabric and plays a role of re-obtaining the stretch capability obtained in the stabilization step. For this purpose, the pre-setting step may be performed under the conditions of a reaction temperature of 150 to 190° C. and an enlargement rate of 15 to 25 m/min, more preferably 20 m/min.

The dyeing step is to apply a commercially valuable color to the fabric. This step may use a disperse dye and/or an acidic dye, and further use one or more additives selected from an antistatic agent, a dispersing agent, a nonflammable agent, and the like. To optimize the dyeability, each additive may be preferably used in the amount of 0.1 to 3 wt %. In order to improve softness, dye stability, and color fastness of the fabric, the dyeing step may be preferably performed at 100 to 130° C. for 10 to 60 minutes.

The final setting step is the final heat setting process, and plays a role of re-stabilization of the changed stretch capability and fixation of the shape after the dyeing process is performed. For this purpose, this step may be preferably performed at the temperature of 130 to 160° C. and the rate of 15 to 25 m/min, preferably, 20 m/min.

The resin treatment step is to obtain flexibility, stretch capability, cushioning capability, and softness. The resin treatment step is performed by treating with a resin containing a mixture of a carboxyl functional silicone softener and a silicon emulsion, a cation-based active surfactant compound, and an anion active solution, at the mixture ratio of 1:1 to 3:2. The resin treatment may be performed simultaneously with, or after, the final setting step under the same conditions as the final setting step.

In still another aspect, the present invention provides a car seat fabricated by using the spacer fabric according to the present invention. The car seat of the present invention provides comfortableness to drivers due to the superior cushionability of the spacer fabric of the present invention; when equipped with an actuator having a moving (massage) effect for the human body, effectively transfers the actuator moving effect to the drivers due to the superior flexibility of the spacer fabric; and when equipped with a heating and/or cooling device such as a TED, effectively exhibits a sufficient heating/cooling effect due to the superior thermal conductivity of the spacer fabric.

The present invention is further explained in more detail with reference to the following examples. These examples, however, should not be interpreted as limiting the scope of the present invention in any manner.

EXAMPLE

Example: 1

Yarn Processing

In this example, various types of yarns were prepared and the properties thereof were tested to determine a proper material suitable to be used for the top and bottom layers.

1.1. Preparation of Yarns 1.1.1. DTY 300/96-1H Yarn

POY 250/48-SD (Kolon, Korea) was drawn at the temperature of 150 to 220° C. and the rate of 300~500 m/min. Two of the drawn yarns were double-twisted into 2-ply yarns through 1 heater setting at the twist ratio of 30Z, to prepare a DTY 300/96-1H yarn. The M/C used was a pin type, and the process was performed under the condition of the yarn speed being 140 m/min and the heater temperature being 200° C.

1.1.2. DTY 300/96-H.S. Yarn

POY 250/48-SD (Kolon, Korea) was drawn at the temperature of 150 to 220° C. and the rate of 300~500 m/min. Two of the drawn yarns were double-twisted into 2-ply yarns through the 2 heater settings at the twist ratio of 20Z. Here a multi-false twister machine was used, and the process was performed with the yarn feed ratio of approximately 1.5 and the heater temperatures of 190° C. (heater 1), 200° C. (heater 2).

1.1.3. LSCY PET&PET Yarn

The PET&PET LSCY, which is a side-by-side type PET and PET yarn prepared by mixing an orientation restrainer to only one side of the yarn during conjugated spinning, was provided from KOLON IND. INC. (Korea).

1.1.4. LSCY PTT&PET Yarn

The PTT&PET LSCY, which is a side-by-side type PTT and PET yarn prepared by using PTT and PET having different peculiar viscosity and shrinkage in conjugated spinning, was provided from KOLON IND. INC. (Korea).

1.2. Measurement of Properties of the Yarns

The properties of the yarns provided as above were measured by the following methods.

1.2.1. Shrinkage Ratio (Sr)

The hank was made at a denier creel machine with 10 as the number of rotations (the take-up stress is nominal denier×1/10 g). The length ($L_0$) of the hank was measured while hanged, with an initial load (nominal denier×1/20 g) and a static load (nominal denier×2 g). The hank was hung and the initial load was heated for 30 minutes in a 100° C. water vessel. Then, it was taken out and moisture was eliminated from the surface, and the hank was left alone for 12 hours at atmospheric conditions. After this, the length ($L_1$) of the hank was measured, once again being hung up with initial load and the static load. The shrinkage was calculated by the following formula.

$$Sr\ (\%) = (L0 - L1)/L0 \times 100$$

1.2.2. Crimp Recovery (CR)

The crimp was measured with two different methods. These methods of measuring the recovery force of the sample were testing without heat treatment and testing after individual heat settings. Then, the length ($L_3$) of the sample was measured after being left alone for 2 minutes under a static load. The sample was subjected to the exactly same testing course as the Sr measurement. The static load was eliminated and the sample was left alone for 3 minutes. Then the length ($L_4$) of the sample was measured. Here, it was decided whether or not to include a heat treatment. Crimp recovery was calculated by the following formula.

$$CR\ (\%) = (L3 - L4)/L3 \times 100$$

1.2.3. Elongation & Tenacity

The properties of elongation and tenacity were measured by the test described in KS K0323. The yarns were elongated until fractured, and the elongation and the force corresponding thereto were measured using a tensile tester.

1.2.4. Results

The results obtained above are shown in the following Table 1. Table 1 shows the physical properties of the yarns that were produced as above.

TABLE 1

| Section | Denier | Elongation [%] | Tenacity [g/d] | Sr [%] | CR [%] | |
|---|---|---|---|---|---|---|
| | | | | | w/o heat treatment | w/ heat setting |
| DTY300/96-1H | 303.4 | 21.9 | 4.7 | 2.7 | 22 | 20.5 |
| DTY300/96-H.S. | 312 | 21.9 | 4 | 3.1 | 66.5 | 48.6 |
| LSCY 300/96-PET&PET | 297.5 | 30 | 2.8 | 9 | 18.6 | 47.3 |
| LSCY 300/96-PTT&PET | 306.6 | 29.3 | 3.4 | 11.4 | 20.4 | 65.4 |

Table 1 shows data obtained by measuring the physical properties of the yarn itself. As shown in Table 1, the LSCY is far superior to others in the Sr ratio, which is a measurement of the shrinkage percentage during the dyeing process. Further, highly shrinking yarn is outstanding in the CR ratio at the atmospheric conditions (20° C., RH 70), while the LSCY showed better results than others under high temperatures with a heat treatment of 180° C. It can be confirmed that the PTT&PET LSCY yarns are the most efficient with regards to the shrinkage ratio and crimp recovery force because the heating is an indispensable process in producing the final end product.

Example 2

Preparation of Spacer Fabric 2.1. Preparation of Top Layer and Bottom Layer

The LSCY PTT&PET Yarn and the DTY 300/96-1H were knitted at the ratio of 1:0.75 to 1:2 using a D/R machine (KARL MAYER Textilmaschinenfabrik GmbH, Germany) as a knitting machine at 500 rpm, to form a top layer and a bottom layer.

2.2. Preparation of Pile Yarn

Polyester monofilaments (Saehan Industries Inc. Korea) were knitted between the top and the bottom layers to create pile yarns linking the two layers.

The pile yarns were prepared so as to have the diameters of 20 and 30 Deniers, and the pile structure forming coordinates of 21100112 and 01122110 at 2 bar, as shown in Table 2.

TABLE 2

|  | 1st bar | 2nd bar |
| --- | --- | --- |
| Strait pattern | 01011010 | 10100101 |
| Cross pattern | 23211001 | 10011223 |
| Semi-cross pattern | 21100112 | 01122110 |

Figure 12:
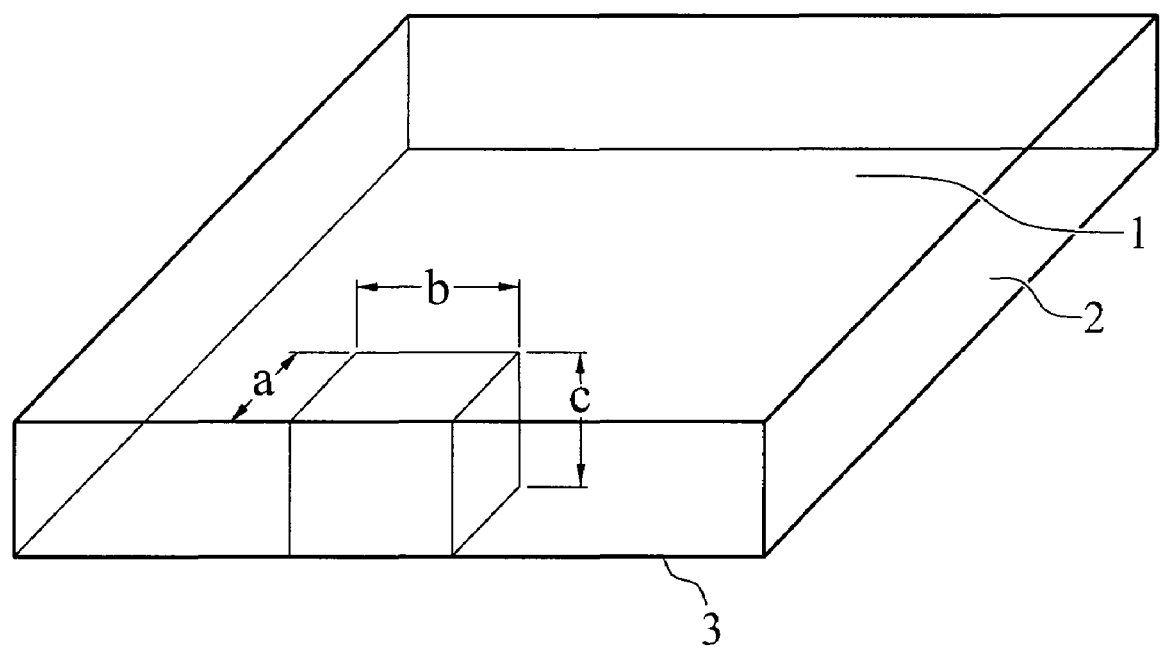
FIG. 12 schematically demonstrates the lay-out of the spacer fabric according to the present invention.

The fabric count and thickness of the fabric as prepared above are schematically demonstrated in FIG. 12. In FIG. 12, a top layer (surface or front) 1, a middle layer (pile) 2, and a bottom layer (base or back) 3 of the space fabric of the present invention are demonstrated.

2.3. Finishing

The prepared spacer fabric containing the top and bottom layers and pile yarns was subjected to the stabilization step under the conditions of a fabric width enlargement of 10%, a rate of 20 m/min, and a temperature of 120° C., and then a pre-setting step at 170° C. and 20 m/min. Thereafter, a dyeing step was performed under the following conditions.

a. Increase 1° C./min to 80° C.
 b. Leveling at 80° C. during 15 min
 c. Increase 1.5° C./min to 110° C.
 d. Dyeing at 110° C. during 30 min
 e. Natural cooling.

After performing the dyeing step, a final setting step was perfprmed at 150° C. and 20 m/min. At the same time with the final setting step, the resin containing, as a softening agent, SF-73K (NICCA), which is a cation-based active surfactant compound and deatron AS-20 (NICCA), which is an anion active solution in the combination ratio of 2:1(SF-73K:AS-20) was treated at the pick-up ratio of 1 to 5%.

Comparative Example

Preparation of Fabric Samples

1. Preparation of the F/W Fabric

Wefts were mix-weaved on beamed wraps (DTY 450 De, Air Textured Yarn(ATY), 520 De) in a desired pattern to design the fabric. Various yarns were used as the wefts. The prepared raw fabric was finished by heating and coating processes to produce the final F/W fabric.

2. Preparation of the C/K Fabric

Each DTY (Polyester, 150 De or 300 De) was knitted with a cheese cone into C/K raw fabric having a circular knit structure in various patterns. The prepared raw fabric was subjected to heat setting and dyeing processes to produce the final C/K fabric.

3. Preparation of the T/C Fabric

Ground yarns (Polyester, 75 De) were beamed and desired yarns as pile yarns (DTY 150 De) were provided and knitted, producing a cut-type tricot product. Heating setting, dyeing, and cutting processes were performed, followed by pile shearing and brushing processes, producing the final T/C fabric.

4. Preparation of the D/R Fabric

The raw fabric (Ground: Polyester, 100 De; Pile: DTY 200 De) was enlarged to both sides by center-slitting, and subjected to heat setting, shearing, and dyeing steps, producing the final D/R fabric.

5. Preparation of the D/R Crease Fabric

The D/R crease fabric was produced by the same method as used in producing the D/R fabric, except arranging the LSCY at the ground, to give an excessive stretch capability, thereby producing a wrinkled fabric.

Example 3

Measurement of Physical Property of the Fabrics 3.1. Stretch 3.1.1. Tensile Strength and Elongation In this example, the tensile strength and elongation were measured by the Labeled strip method. From each of the fabrics prepared in Example 2 and the comparative examples, five samples 55 mm wide and about 250 mm long were cut in warp and weft directions respectively. Approximately the same number of threads were removed from both edges in order to make the width 50 mm. Marks were placed 100 mm apart in the lengthwise center, later to be used during the test. Here, a tensiron type tension tester (Tensile Machine Instron 4444, Instron), or an equivalent was used, and the sample was gripped by the jaw and placed. A proper initial load (which is defined as the load necessary for stretching out artificial crumples and slackness) was applied so as to place the thread correctly in a vertical line with a 150 mm distance between the jaws.

The jaw was driven at the rate of 200 mm/m and the load [N/50 mm (kgf/50 mm)] required for cutting, and the distance between the marks at rupture was measured. The average of the five horizontal/vertical results (from 5 different samples) was considered as the final result. When the load application rate was different from 200 mm/min, it was reported. The elongation was calculated by the following formula.

Elongation (%)=($L1-L0$)/$L0$×100

Here, L0: distance between marks before test (mm)
 L1: distance between marks at rupture (mm)

3.1.2. Elongation at Specified Load and Elongation Set

From each of the fabrics prepared in Example 2 and the comparative examples, three samples (50 mm in width and 250 mm in length) were cut in both warp and weft directions. Marks were placed 100 mm apart in the center of the samples, and each sample was placed in the Martens fatigue tester with a jaw distance of 150 mm. Slowly, a load of 78.4N (8 kgf) (including the lower clamp weight) was applied, and then left standing for 10 minutes with the load applied, determining the distance between the marks. Then, the clamps were removed to relieve the samples from the load, they were allowed to stand on a flat bench for 10 minutes, and then the distance between the marks was determined. The elongation at specified load and the elongation set were calculated by the following formula, and the obtained results are shown in Table 6.

Elongation at normal load (%)=l1–100

Elongation set (%)=l2–100

Here, l1: distance between marks 10 minutes after loading (mm)

l2: distance between marks 10 minutes after removal of load (mm)

3.2. Cushion Force

Cushion force was measured through the testing method for carpet as described in KS K 1018. From each of the fabrics prepared in Example 2 and the comparative examples, five (5) sheets of 250×250 mm were cut. A compression recovery tester (cloth thickness measuring apparatus 2046-08, Mitutoyo) was used. The thickness (mm) of the sample was measured after pressurization at 2 to 4 kPa for 30 seconds under regular pressure and then for 5 minutes under a final pressure (defined as 98 kPa unless otherwise noted). Then, the load was removed, and the samples were left alone for 5 minutes. The thickness (mm) was measured after further pressurization for 30 seconds.

The compression ratio, the compression recovery ratio, and the thickness reduction ratio due to the compression were calculated down to one decimal place by the following formulas. The obtained results are shown in Table 6.

Compression (%)=$(t0-t1)/t0 \times 100$

Compression recovery (%)=$(t'0-t1)/(t0-t1) \times 100$

Thickness reduction (%)=$(t0-t'0)/t0 \times 100$

Here, t0: thickness at the regular pressure before the pressurization (mm)

t1: thickness at the final pressure after letting alone for 5 minutes (mm)

t'0: thickness at the pressurization till the settled pressure after removal of load (mm)

3.3. Thermal Conductivity

The thermal conductivity was measured by two methods. One measured the thermal conductivity itself, wherein the thermal conductivity coefficients of the two-dimensional fiber group including both of weaved and knitted fabrics were measured. The other measured the air permeability including the factors of conductivity, convection, and radiation, wherein the quantity of air passed through the test samples. Also, thermal conductivity is predicted by the thermal flow owing to the temperature gradient.

3.3.1. Thermal Conductivity

The thermal conductivities of the test samples were measured by the test method of thermal transmittance of textile fabrics (KS K 0466). At a steady state of thermal conductivity between two parallel plans, a per unit thermal transfer phenomenon occurs due to the difference in the temperatures of unit amounts between two plans. Here, the thermal conductivity represents the working direction or working transfer amount per unit temperature gap between two plans and per unit area. Therefore, thermal conductivity is obtained by the distance between the plans multiplied by the thermal transfer coefficient. The dimension ends up being W/m·k. The obtained results are shown in Table 6. The thermal conductivity is calculated by the following formula.

Thermal Conductivity=$P/\{A \times (Tp-Ta)\}$

Here, P: consume electricity of the test plate (W)

A: Area of the plate (m2)

Tp: Temperature of the plate (° C.)

Ta: Temperature of air (° C.)

3.3.2. Air Permeability

Air permeability was measured by the determination of the permeability of textile cloth to air (KS K 0570). From each of the fabrics prepared in Example 2 and the comparative examples, three test samples of 180×180 mm were cut and attached to one end of a Flagire type ventilation tester. The suction fan was adjusted by rheostat so that the tilting barometer stands at a pressure of 12.7 mm water head. The airflow passing through the sample was read in ml/cm2·sec. in accordance with the table attached to the tester on the basis of the pressure of the vertical barometer at that time and the type of air orifice used. The average of three readings was considered as the final result, which is shown in Table 6.

3.4. The Rest

3.4.1. Taber Rotary Abrasion Test

A circular sample of about 150 mm in diameter was cut, and a 6 mm diameter hole was drilled in the center. This was placed in an abrasion tester (a Taber abrasion machine specified in JIS L 1096) and the test was conducted under the following conditions in Table 3. The surface was subjected to the test abrasion wherein the grade was evaluated based on the criterion in Table 4. The obtained results are shown in Table 6.

TABLE 3

Conditions of the abrasion test

| Condition Application | Abrasion | Load[5] (N(gf)) | Cycles |
|---|---|---|---|
| Seat and other locations subject to heavy abrasion Trims, headlining, and other parts subject to comparatively light abrasion | CS-10 | 4.9 (500) | 1000 500 |

* The load herein means the load acting on a single arm. The test was conducted by the load action on both arms

TABLE 4

Valuation basis in abrasion test

| Grade | Extent of Abrasion |
|---|---|
| 5 | Nearly no trace of abrasion noticeable |
| 4 | Somewhat fluffy on surface with trace of abrasion noticeable |
| 3 | Noticeable fluff on abraded area, but only on surface, no fluff formation from inside |
| 2 | Presence of thread breakage on abraded area, excessive fluff produced |
| 1 | Excessive abrasion on surface, lining cloth can be seen through fabric |

3.4.2. Color Fastness to Washing

A test sample of about 40 mm in width and 50 mm in length was cut and placed in a beaker together with a white cotton cloth ("Cotton No. 3" known as "Shirting No. 3", specified in Table 2 under JIS L 0803) of the same size on a beaker containing 0.5% detergent solution (for detergent, use neutral detergent or class 1 of JIS K 3302) at 60±2° C. The beaker was stirred with a glass rod for 10 minutes in a water bath. The sample and the white cloths were removed from the beaker, thoroughly rinsed, and dried at 70 to 75° C. The samples were inspected for change in color caused by dye transfer. These readings were evaluated based on the criterion in Table 5. The obtained results are shown in Table 6.

TABLE 5

A valuation basis in color fastness

| Grade | Evaluation | Criterion for Evaluation |
|---|---|---|
| 5 | Excellent | Perfectly free |
| 4 | Good | A little noticeable but not conspicuous |
| 3 | Somewhat good | A little and clearly noticeable |
| 2 | Fair | A little excessive |
| 1 | Fair | Excessive |

3.4.3. Color Fastness to Rubbing with a Dry Cloth and a Sweat Cloth

The color fastness may be divided into two types to rubbing with a dry cloth and a sweat cloth.

The color fastness to rubbing with a dry cloth was measured as follows. Two samples of 25 mm in width and 220 mm in length were cut parallel to the warp direction and placed firmly on the stand of a friction tester (intended to be JIS L 0823 type II; for this test, the test sample stand of 200 mm radius semi-circular form was used). The samples were securely held and the tester friction shoe was covered with white cotton cloth ("Cotton No. 3" known as "Shirting No. 3", specified in Table 2 under JIS L 0803) of 50 mm×50 mm. A load of 4.9N (500 gf) was applied to the friction shoe. The shoe was driven back and forth 100 cycles with a stroke of 100 mm at the rate of 130 cycles/m. Then, the white cotton cloth (50 by 50 mm) was removed. A load of 4.9N (500 gf) was applied to the friction shoe. The shoe was driven back and forth 100 cycles with a stroke of 100 mm at the rate of 130 cycles/min. Then the white cotton cloth was removed. Visually, the grade of staining is determined based on the gray scale (JIS L 0805).

The test of rubbing with a sweat cloth was the same as the testing with a dry cloth. A white cotton cloth was immersed in an artificial sweat solution having the following composition (Method D in JIS L 0848) for 10 minutes and wrung out slightly. Immediately, the friction test was conducted and the readings were determined in the same manner as the dry cloth testing. The artificial sweat solution had the following chemicals, which were diluted in distilled water to 1l (pH 4.5):

Class 1 or better of JIS K 9010 [Sodium phosphate, dibasic (12 hydrate)], 8 g; Class 1 or better of JIS K 8150 (Sodium chloride), 8 g; Class 1 or better of JIS K 8355 [Acetic acid (99~100%)(Glacial acetic acid)], 5 g; and distilled water of pH 4.5 to be 1l.

The obtained results are shown in Table 6.

3.5. Test Results

The physical property data obtained above according to the different fabric types are shown in the following Table 6.

The results shown in Table 6 are as follows. The F/W and spacer fabrics are superior in tensile properties. The C/K and T/C fabrics are superior in elongation property. The C/K, spacer fabric, and pleated fabric are superior in extension property. F/W, spacer fabric, and pleated cloth are superior in elongation set property. Here, the resulted value for the F/W fabric was too insignificant to have a meaning. The spacer fabric and the T/C fabric are superior in abrasion property. The T/C and spacer fabrics are superior in thermal conductivity property. The C/K and spacer fabric are superior in air permeability. In conclusion, the spacer fabric has the most preferable values than any other fabrics tested.

Example 4

Properties of Fabric Depending on Hole Size

The design capable of being expressed as the spacer fabric can be realized by the formation of holes on the top layer of the surface. Such holes can increase the thermal conductivity of the fabric. Also, a circle is the most stable and stretchable design. The efficiency of the spacer fabric is tested based on the circle form. The circle diameter of one direction was changed under conditioning at the warp direction (MD) or the weft direction (AMD) individually, to produce the spacer fabric as in Example 2. The results are shown in Table 7 and FIGS. 2 to 5.

TABLE 6

A comparative table classified by the fabric type

| | Section | F/W MD | F/W AMD | C/K MD | C/K AMD | T/C MD | T/C AMD | D/R MD | D/R AMD | D/R Crease Fabric MD | D/R Crease Fabric AMD | Spacer Fabric MD | Spacer Fabric AMD | Note |
|---|---|---|---|---|---|---|---|---|---|---|---|---|---|---|
| Physical Properties | Tensile | 289 | 75 | 84 | 35 | 71 | 73 | 87 | 127 | 100 | 134 | 1738 | 1233 | kg f/ 50 mm |
| | Elongation | 33.5 | 33.6 | 56 | 206 | 68 | 88 | 37 | 72 | 49 | 97 | 64.4 | 86 | % |
| | Extension | 3.5 | 3.5 | 20 | 153 | 14.5 | 22.5 | 7 | 29.5 | 9 | 30 | 9 | 26 | % |
| | Set | 0.5 | 0 | 0 | 15 | 1 | 4 | 1.5 | 6 | 1.5 | 6 | 0 | 6 | % |
| | Taber | 3 | | 3 | | 3–4 | | 3 | | 3 | | 4 | | grade |
| | Thermal Conductivity | 0.036 | | 0.041 | | 0.067 | | 0.046 | | 0.042 | | 0.059 | | W/mK |
| | Air Permeability | 10.1 | | 270.6 | | 32.6 | | 63.7 | | 31.6 | | 181.7 | | cm$^3$/ cm$^2$/S |
| Relative Estimation | Tensile | 6 | | 1 | | 2 | | 3 | | 4 | | 5 | | Point |
| | Elongation | 1 | | 6 | | 5 | | 2 | | 3 | | 4 | | 1: |
| | Extension | 1 | | 6 | | 4 | | 4 | | 5 | | 4 | | Worst |
| | Set | 6 | | 1 | | 5 | | 3 | | 3 | | 5 | | ~6: |
| | Taber | 4 | | 4 | | 5 | | 4 | | 4 | | 6 | | Best |
| | Thermal Conductivity | 1 | | 2 | | 6 | | 4 | | 3 | | 5 | | |
| | Air Permeability | 1 | | 6 | | 3 | | 4 | | 2 | | 5 | | |
| | Synthesis | 20 | | 26 | | 30 | | 24 | | 24 | | 34 | | Point |

* MD: Machine Direction (MD). AMD: Across Machine Direction

TABLE 7

The results of spacer fabric by a hole size

| | | MD-fixed | | | | | AMD-fixed | | | | |
|---|---|---|---|---|---|---|---|---|---|---|---|
| Hole | MD | 4.5 | 4.5 | 4.5 | 4.5 | 4.5 | 2 | 4 | 6 | 8 | 10 |
| Size | AMD | 1.5 | 2.5 | 3 | 4 | 5 | 3 | 3 | 3 | 3 | 3 |
| [mm] | Avg.((MD + AMD)/2) | 3 | 3.5 | 3.75 | 4.25 | 4.75 | 2.5 | 3.5 | 4.5 | 5.5 | 6.5 |
| | Thermal Conductivity [W/mK] | 0.051 | 0.057 | 0.059 | 0.05 | 0.042 | 0.052 | 0.058 | 0.051 | 0.042 | 0.033 |
| Extension | MD | 19 | 23 | 24 | 20 | 18 | 14 | 21 | 17 | 17 | 18 |
| [%] | AMD | 29 | 32 | 35 | 35 | 34 | 38 | 40 | 40 | 43 | 44 |
| | Sum (MD * AMD) | 5.51 | 7.36 | 8.4 | 7 | 6.12 | 5.32 | 8.4 | 6.8 | 7.31 | 7.92 |
| Recovery | MD | 94 | 94 | 95 | 93 | 93 | 96 | 93 | 95 | 92 | 90 |
| [%] | AMD | 90 | 88 | 85 | 86 | 87 | 90 | 87 | 86 | 88 | 85 |
| | Sum (MD * AMD) | 84.6 | 82.72 | 80.75 | 79.98 | 80.91 | 86.4 | 80.91 | 81.7 | 80.96 | 76.5 |

Here, the changed ratios of the AMD holes and the MD holes are compared. This reveals that the sensitivity of thermal conductivity by variation of the AMD holes is higher than that by variation of the MD holes by about 2 times. In other words, it is more effective to control thermal conductivity by variation of the AMD holes.

Figure 2:
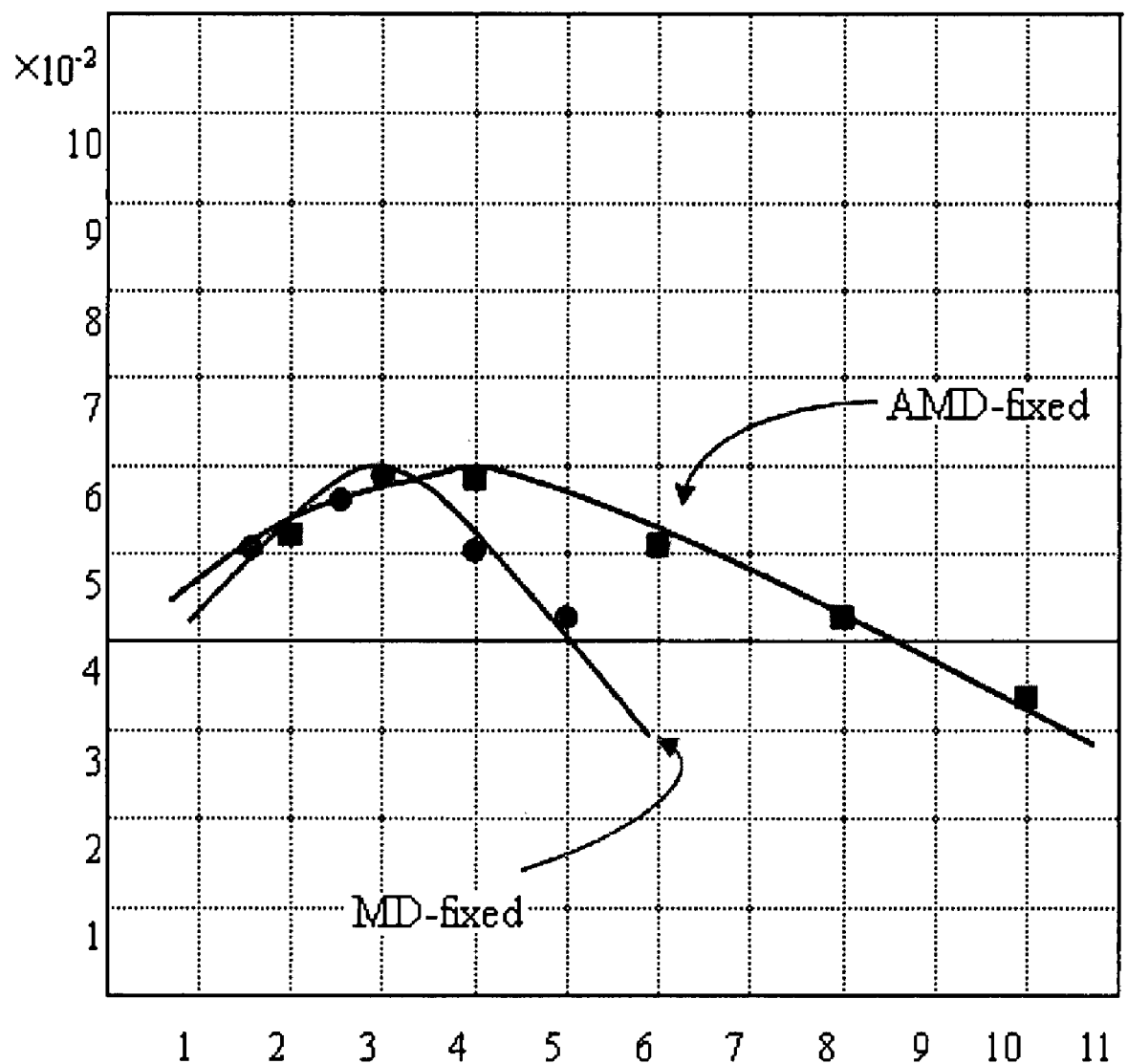
FIG. 2 is a graph showing the comparison of the thermal conductivity of the surface of the spacer fabric depending on the hole size.
Figure 3:
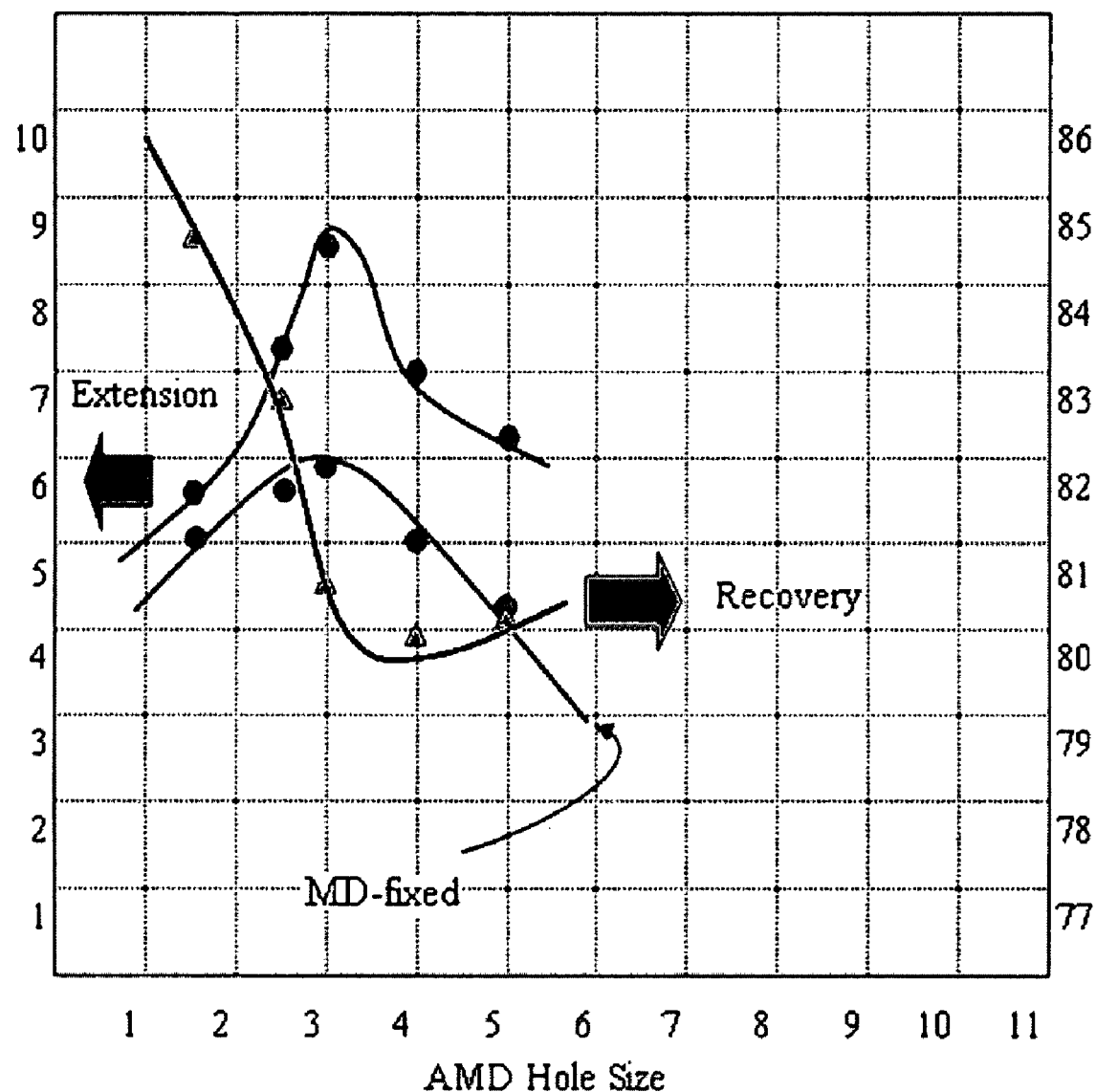
FIG. 3 is a graph showing the comparison of the extension and the recovery of the surface of the spacer fabric depending on AMD hole size with fixing MD hole.
Figure 4:
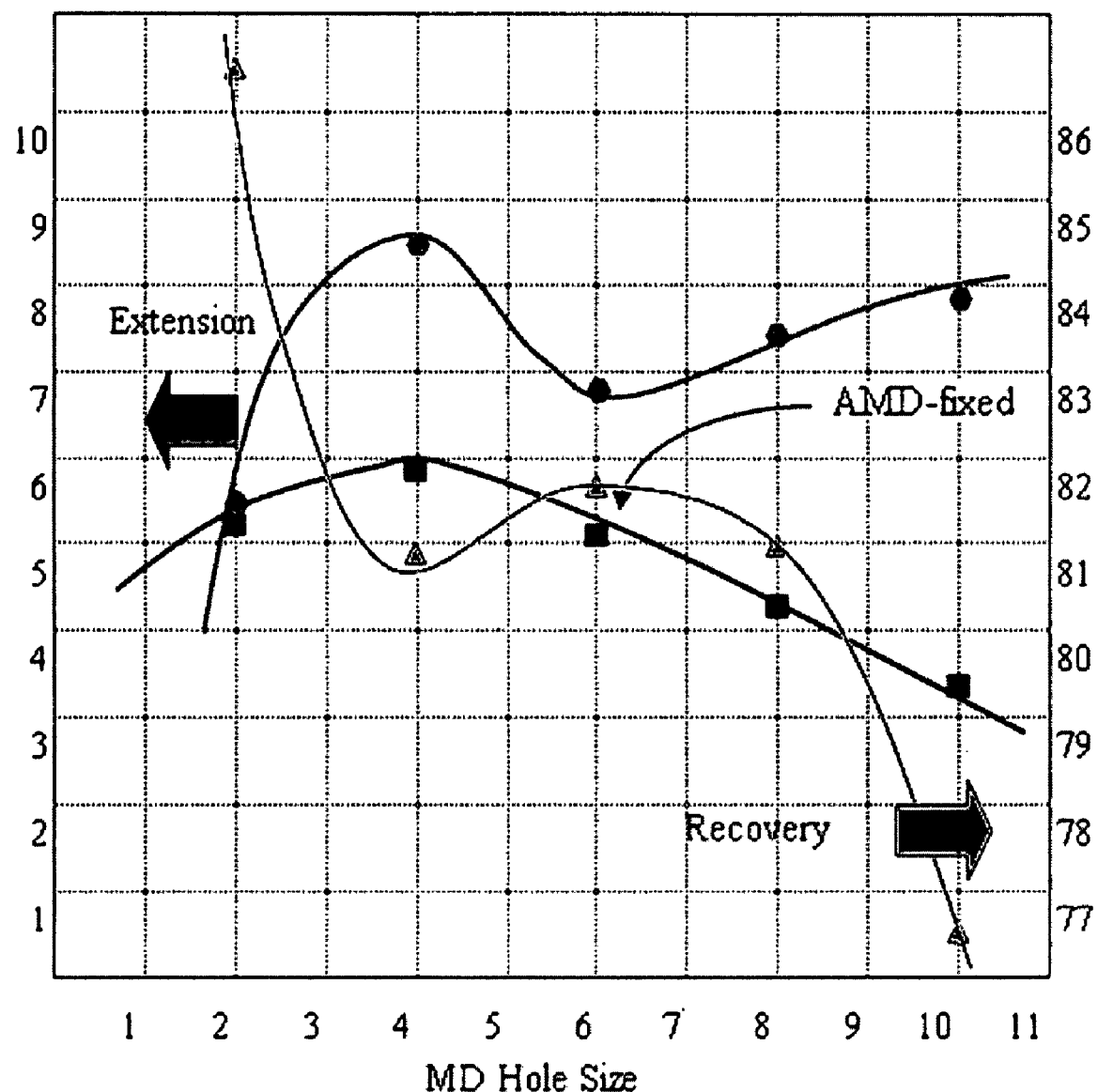
FIG. 4 is a graph showing the comparison of the extension and the recovery of the surface of the spacer fabric depending on MD hole size with fixing AMD hole.

Each of the two graphs shown in FIGS. 2 and 3 respectively expresses a different phenomenon. However, this shows that the absolute value of extension and recovery is almost in inverse proportion. Also each value of intensity of extension and recovery was more sensitive to moving with fixation of the MD holes, similar to the thermal conductivity results.

Figure 5:
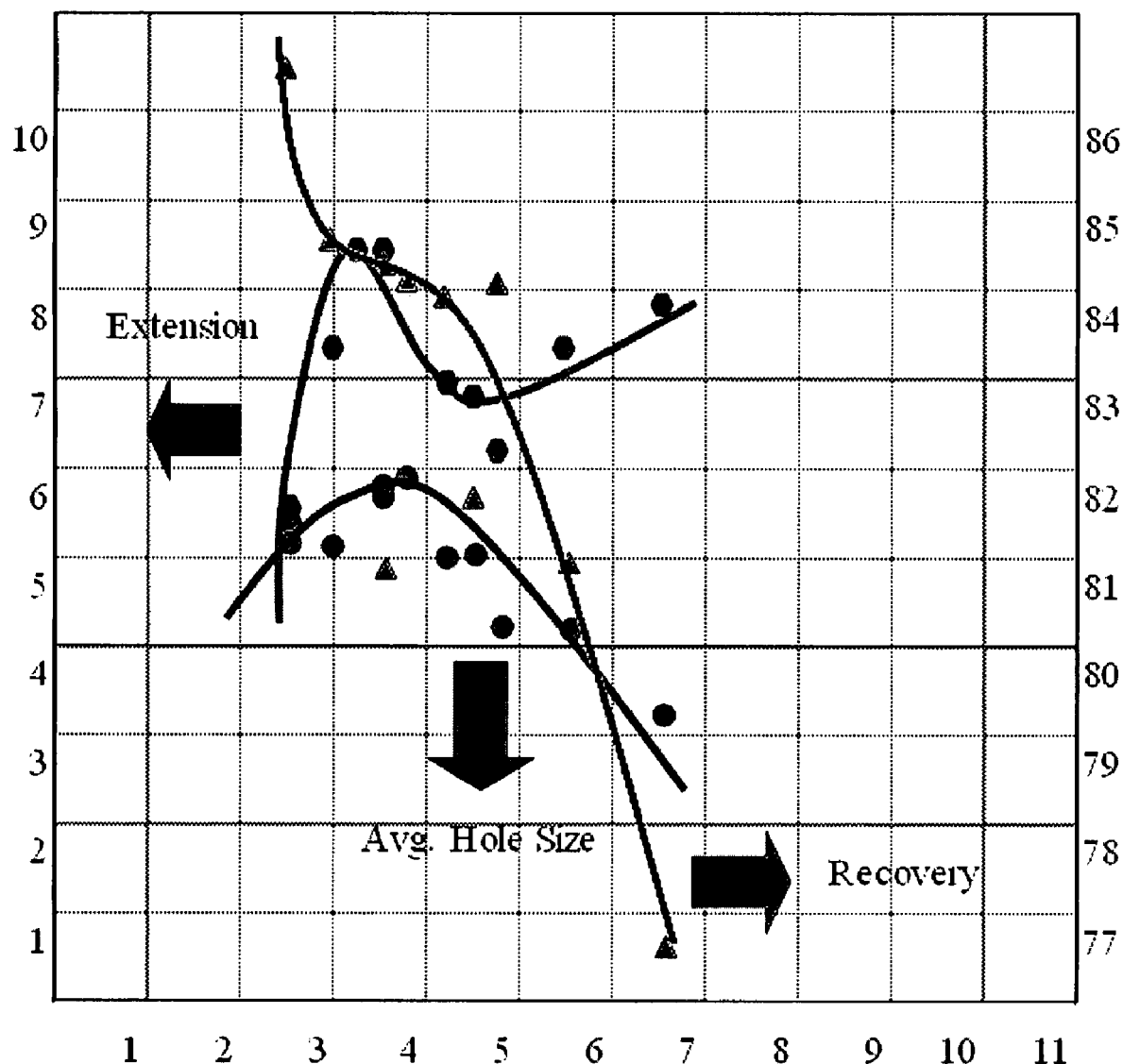
FIG. 5 is a graph showing the comparison of extension and recovery of the surface of the spacer fabric depending on the average hole size.

The average hole size represents the average lengths (mm) of the MD and AMD holes. FIG. 5 graphs the measured values at each point of the average hole size. Here, it is inferred that the hole range makes the optimization of thermal conductivity, extension, and recovery. The average value is about 3 to 5 mm. At that the fixation values of the MD and AMD holes are 4.5 and 3, respectively. Finally, it is shown that it is more effective when the shape of the hole is a perfect circle, not an oval shape. This result adds support for the importance of the hole form.

Example 5

Properties of Pile Yarn 5.1. Properties Depending on the Diameter and Bar Used

The monofilaments of 20 Denier and 30 Denier yarns that were prepared in Example 2.2 were used and the used bars were settled to 1 bar and 2 bar to prepare pile yarns. The properties of the obtained pile yarns are shown in Table 8.

TABLE 8

Compression Recovery depending on the pile yarn

| | Pile Yarn Denier Section | | | |
|---|---|---|---|---|
| | 20D | | 30D | |
| | # of Bar | | | |
| | 1 | 2 | 1 | 2 |
| Run in [mm/R] | 9,300 | 9,800 | 9,500 | 10,200 |
| Fabric Pile Height [mm] | 2.4 | 3.9 | 3.5 | 4 |
| Compression Recovery Ratio[%] | 85 | 83 | 88 | 89 |
| Final P.H. [mm] | 2.0 | 3.2 | 3.1 | 3.6 |

As shown in Table 8, 30 Denier is a little lower than 20 Denier in efficiency softening, but it is far higher in elasticity of the fabric. Also it is revealed that for the knitted fabric, using 2 bars is better than 1 bar for the initial pile height as well as the final pile height after the compression testing. Testing of 20 Denier for bar factor revealed similar results.

5.2. Properties Depending on the Pile Pattern

As known from the results observed with the straight pattern, the cross pattern, and the semi-cross pattern as shown in Table 2, the cross pattern has a high initial fabric pile height. However, it is confirmed that the semi-cross pattern has a higher pile height and elasticity than the others because of the difference of compression recovery force. It is inferred that the knitted stitch has a distance of 1.15 mm with side wale as the best value at the constitution of the cross-sectional relation amongst each other for support and balance. However, excessive swinging to other side had a bad influence on compression recovery.

Here, the test was performed with the machine plate distance of 4 mm. Then the fabric pile height and the compression recovery force are measured by the final machine plate distance. The results are shown in Table 9.

TABLE 9

Compression Recovery by pile pattern

| | Pile Constitution Section | | |
|---|---|---|---|
| | Straight | Cross | Semi-cross |
| Run in [mm/R] | 10,200 | 11,000 | 10,800 |
| Fabric Pile Height [mm] | 4 | 4.3 | 4.2 |
| Compression Recovery Ratio[%] | 89 | 85 | 94 |

Here, the test was performed with the machine plate distance of 4 mm. Then the fabric pile height and the compression recovery force were measured by the final machine plate distance. The results are shown in Table 10.

TABLE 10

Compression Recovery depending on M/C plate distance

| | M/C Plate Distance | | | | |
|---|---|---|---|---|---|
| Section | 2 | 4 | 6 | 8 | 10 |
| Run in [mm/R] | 8,900 | 10,800 | 11,200 | 11,700 | 12,150 |
| Fabric Pile Height [mm] | 2.2 | 4.2 | 6 | 7.8 | 9.5 |
| Compression Recovery Ratio[%] | 98 | 94 | 94 | 93 | 76 |

Figure 6:
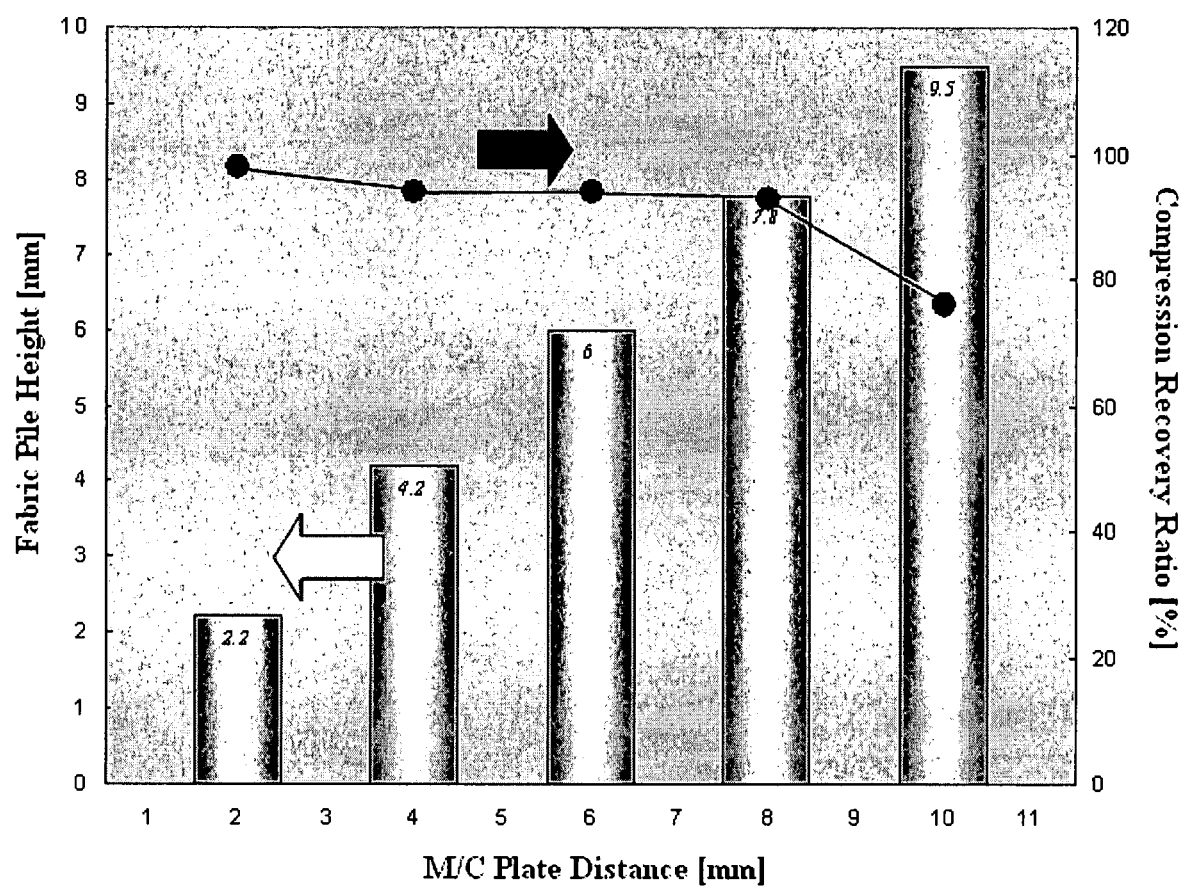
FIG. 6 is a graph showing the comparison of fabric pile height and the compression recovery of the spacer fabric depending on M/C plate distance.
Figure 7:
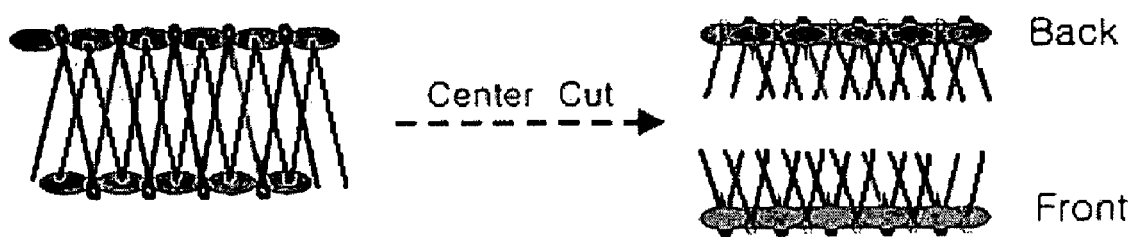
FIG. 7 shows a schematic view showing the structure of the D/R fabric.
Figure 8:
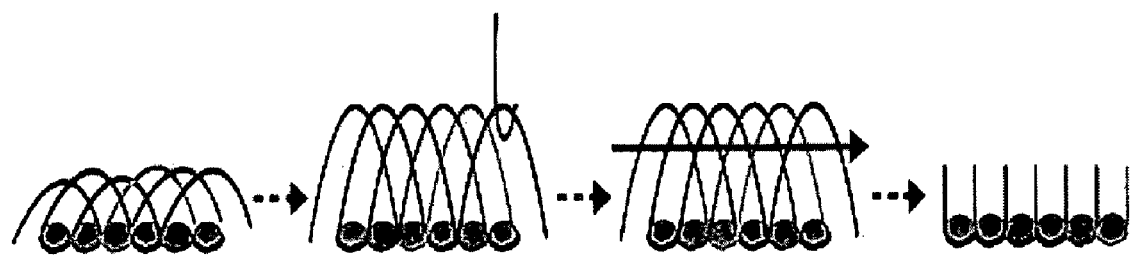
FIG. 8 shows a schematic view showing the structure of the T/C fabric.
Figure 9:
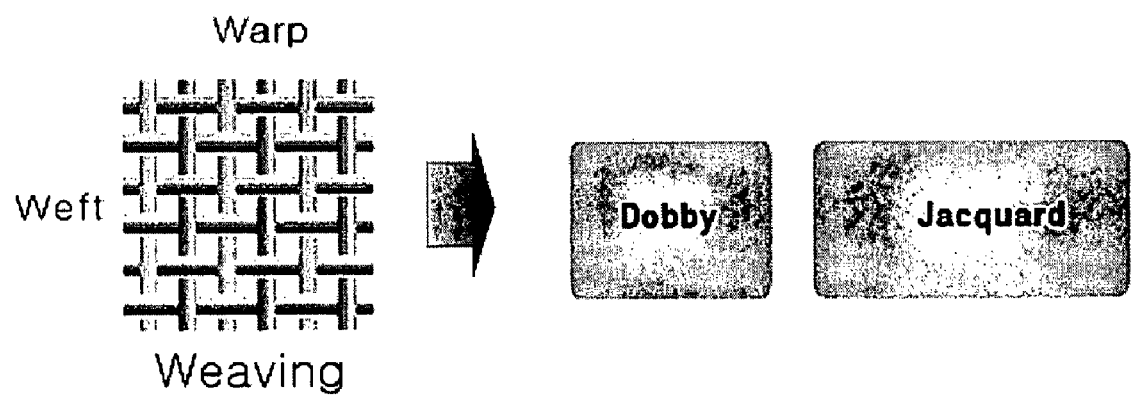
FIG. 9 shows a schematic view showing the structure of the F/W fabric.
Figure 10:
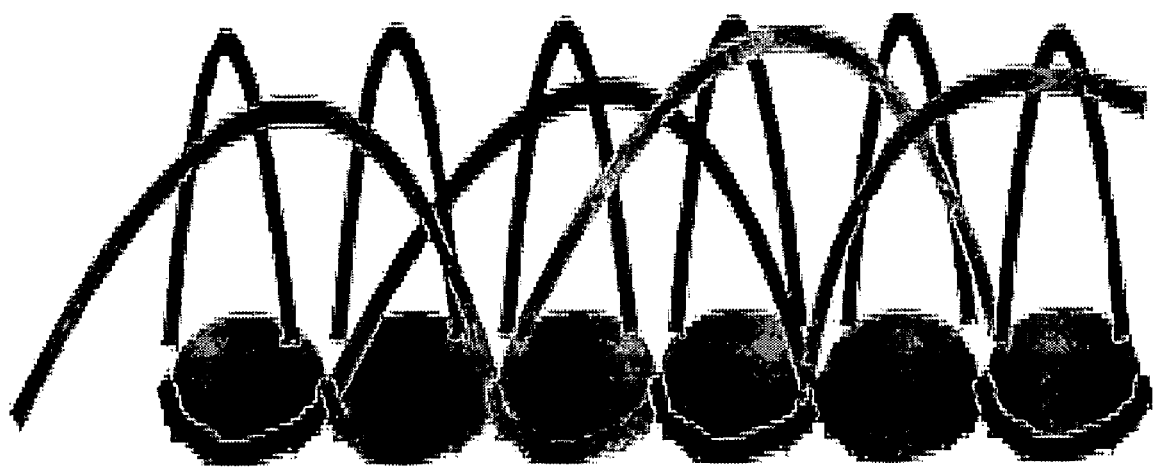
FIG. 10 shows a schematic view showing the structure of the C/K fabric.
Figure 11:
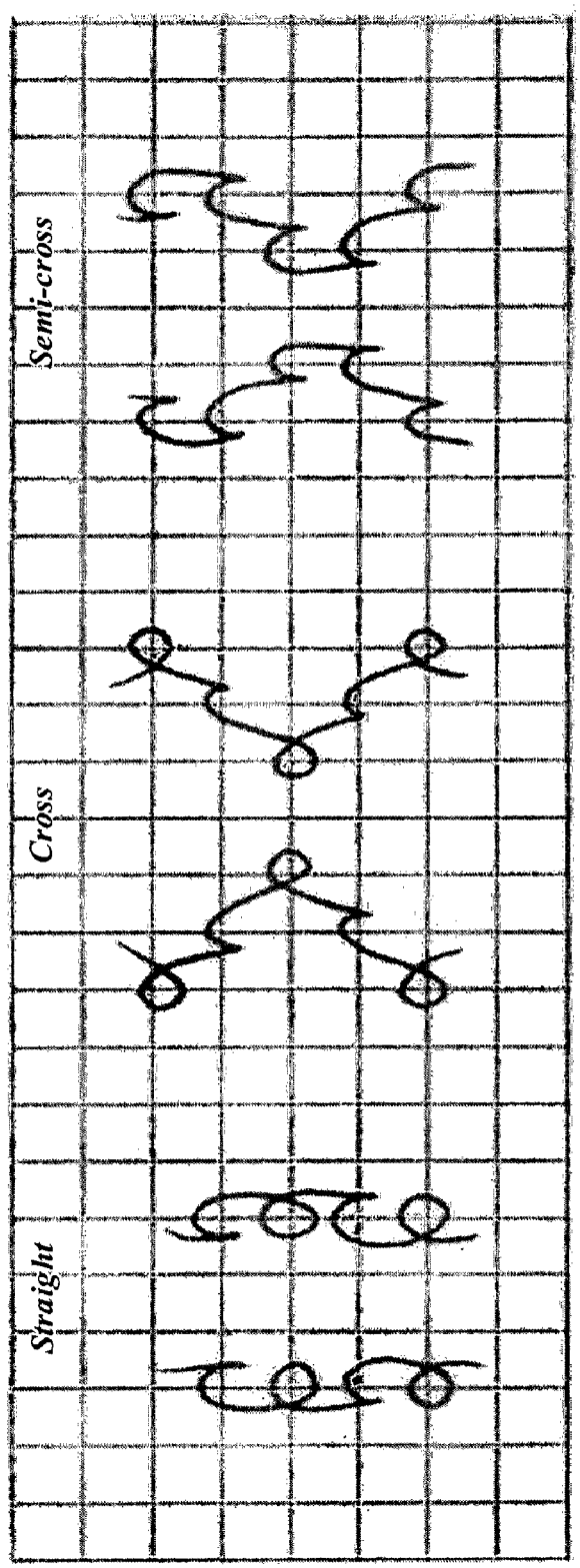
FIG. 11 shows the pile patterns.

The pile height of the fabric increases in a similar fashion as the enlargement of the machine plate distance at the initial state. The increasing ratio is almost linear until it is 8 mm. However, this phenomenon is not maintained in the condition over 10 mm. The recovery ratio suddenly decreases after hitting 10 mm. This is a hint to the possible thickness of spacer fabric and the limitation of elasticity. In this research, 8 mm was the optimum machine plate distance. The results are represented in FIG. 6. The pile tested had the structure of 30D monofilament yarn and the semi-cross pattern.

Example 6

Properties of Fabric Depending on Yarn Ratio

The physical property of the spacer fabric was tested by the measurement of the LSCY ratio. The spacer fabric was prepared varying the portion of the LSCY as in Example 2. The results are represented in Table 11.

pression recovery and cushion properties are inversely related. Regarding extension, NSM5004C is superior, while the NSM5004B is superior regarding set (MD, AMD) and cushioning comparatively, although both have the same pattern and design.

The ratio of LSCY in NSM5003A increased from 30% to 40%, which is higher by 10% than in NSM5004B. However, due to the design of the fabric, yarn tension seemed to be excessively high. This problem posed as a great obstacle in the future expression of LSCY. That is, it should have high firmness and much pleating like that of NSM5003B, if every yarn does not have the optimum space for the making of an ideal helical structure through the heat setting process.

The results are shown in Table 12. Here, the evaluation of working efficiency was performed according to the researcher's judgment, while the appearance was evaluated by the

TABLE 11

The physical property of spacer fabric by yarn ratio

| | Section | NSM5004C | | NSM5004B | | NSM5003A | | NSM5004A | | NSM5001B | |
|---|---|---|---|---|---|---|---|---|---|---|---|
| | Yarn [%] | Type LSCY300 | wt % 20 | Type LSCY300 | wt % 30 | Type LSCY300 | wt % 40 | Type LSCY300 | wt % 50 | Type LSCY180 | wt % 80 |
| P.P. | Direction | MD | AMD | MD | AMD | MD | AMD | MD | AMD | MD | AMD |
| | Tensile | 124 | 88 | 98 | 50 | 120 | 122 | 135 | 141 | 124 | 88 |
| | Elongation | 71 | 96 | 58 | 51 | 66 | 78 | 90 | 110 | 71 | 96 |
| | Extension | 24.5 | 35.5 | 7 | 26.5 | 8 | 20 | 18 | 50 | 24.5 | 35.5 |
| | Set | 1.3 | 5.3 | 0.5 | 3 | 0.5 | 7.3 | 0.5 | 9.5 | 1.3 | 5.3 |
| | Compression Recovery | 89.6 | | 94.3 | | 76 | | 94.1 | | 88.7 | |
| | Thermal Conductivity | 0.031 | | 0.062 | | 0.062 | | 0.061 | | 0.063 | |
| | Air Permeability | 102.7 | | 149 | | 45.7 | | 28.6 | | 84 | |

The knitting process and the finishing process of the yarn portion of 20, 30, 40, 50, and 80 wt % can be various depending upon the pattern or design. In other words, problems of working feasibility are caused by excessive contraction (about 50 wt %) and pleat. The NSM5004A was a knitted fabric made by LSCY300. However, regardless of the fact that NSM5001B is a knitted fabric made by LSCY180, comtester's sensory test. Comparative analysis was carried out 3 times, and the average of the three readings was considered. The relative evaluation index is as follows:

⊚: Excellent;

○: Good;

△: Normal; and

×: Bad.

TABLE 12

The relative evaluation sheet of spacer fabric by yarn ratio

| | Section | NSM5004C | NSM5004B | NSM5003A | NSM5004A | NSM5001B |
|---|---|---|---|---|---|---|
| Operation Efficiency | Knitting | ⊚ | ⊚ | ○ | ○ | ⊚ |
| | Finishing | ⊚ | ⊚ | × | × | ⊚ |
| External Appearance | Softness | ⊚ | ⊚ | ○ | ○ | ⊚ |
| | Non-crease | ⊚ | ⊚ | △ | × | ⊚ |
| | Fabric Thickness | ○ | ⊚ | ⊚ | ⊚ | × |
| Relative Estimation | Tensile | ⊚ | ⊚ | ⊚ | ⊚ | ⊚ |
| | Elongation | ⊚ | ⊚ | ⊚ | ⊚ | ⊚ |
| | Extension | ○ | ○ | ⊚ | ○ | ○ |
| | Set | ⊚ | ⊚ | ⊚ | ○ | ⊚ |
| | Compression Recovery | ○ | ⊚ | ⊚ | ⊚ | ○ |
| | Thermal Conductivity | △ | ⊚ | ⊚ | ⊚ | ⊚ |
| | Air Permeability | ○ | ⊚ | × | × | △ |
| | Total Evaluation | ○ | ⊚ | △ | △ | △ |

Example 6

Properties of Fabric Depending on Finishing Condition

The knitting or weaving process makes the basic form of raw white fabric, while the finishing process plays a role in stabilization of the form and expression of the final function of the seat cloth. I⊙n this research, the finishing process was divided into a total of 4 steps, those being stabilization, PS, dyeing, and FS.

6.1. Stabilization Step

This was performed under the temperature range of 100 to 140° C., and the fabric width enlargement was 5% and 10%. Also, the following are the conditions for the next processes: PS 150° C. and 170° C., dyeing 110° C. and 130° C., and FS 140° C. and 160° C. The results are represented in Table 13.

TABLE 13

The result of the stabilization process

| | Section | | S1 | S2 | S3 | S4 | S5 | S6 | S7 | S8 | S9 | S10 | S11 | S12 |
|---|---|---|---|---|---|---|---|---|---|---|---|---|---|---|
| Condition | Stabilization | Temp[° C.] | 100 | | 120 | | 140 | | 100 | | 120 | | 140 | |
| | | Width enlargement [%] | 5 | 10 | 5 | 10 | 5 | 10 | 5 | 10 | 5 | 10 | 5 | 10 |
| | | PS [° C.] | | | 150 | | | | | | 170 | | | |
| | | DYE [° C.] | | | 110 | | | | | | 130 | | | |
| | | FS [° C.] | | | 140 | | | | | | 160 | | | |
| | Extension [%] | | 31 | 31 | 33 | 32 | 32 | 30 | 26 | 24 | 26 | 25 | 23 | 22 |
| | Recovery [%] | | 84 | 91 | 87 | 90 | 82 | 87 | 83 | 86 | 87 | 94 | 86 | 89 |

6.2. Post Setting Step (PS Step)

Stabilization conditions were fixed at 10% fabric width enlargement and 120° C. chamber temperature. The PS temperature range was 150 to 190° C. The following are the conditions for the next processes: dyeing 110° C. and 130° C., and FS 140° C. and 160° C. The results are represented in Table 14.

TABLE 14

The result of the Pre-Setting Process

| | Section | P1 | P2 | P3 | P4 | P5 | P6 | P7 | P8 | P9 | P10 |
|---|---|---|---|---|---|---|---|---|---|---|---|
| Condition | Stabilization[° C.] | | | 120 (10% Width Enlargement) | | | | | | | |
| | PS [° C.] | 150 | 160 | 170 | 180 | 190 | 150 | 160 | 170 | 180 | 190 |
| | DYE [° C.] | | | 110 | | | | | 130 | | |
| | FS [° C.] | | | 140 | | | | | 160 | | |
| | Extension [%] | 32 | 33 | 32 | 29 | 22 | 26 | 25 | 25 | 20 | 18 |
| | Recovery [%] | 90 | 89 | 92 | 93 | 95 | 91 | 92 | 94 | 95 | 97 |

6.3. Dyeing step

Stabilization was fixed at 120° C. and PS 170° C. chamber temperature. The dyeing process was performed at the temperature range of 100 to 130° C. The next process, FS is performed at 140° C. and 160° C. individually. The rest of the conditions are shown in the following Table 15. The working method of the dyeing process at 110° C. is as follows:

a. Increase 1° C./min to 80° C.
b. Leveling at 80° C. during 15 min
c. Increase 1.5° C./min to 110° C.
d. Dyeing at 110° C. during 30 min
e. Natural cooling.

The results are shown in Table 15

TABLE 15

The result of the Dyeing Process

| | Section | D1 | D2 | D3 | D4 | D5 | D6 | D7 | D8 |
|---|---|---|---|---|---|---|---|---|---|
| Condition | Stabilization [° C.] | | | | 120 | | | | |
| | PS [° C.] | | | | 170 | | | | |
| | DYE [° C.] | 100 | 110 | 120 | 130 | 100 | 110 | 120 | 130 |
| | FS [° C.] | | | 140 | | | | 160 | |
| | Extension [%] | 34 | 32 | 30 | 27 | 28 | 28 | 27 | 25 |
| | Recovery [%] | 90 | 92 | 94 | 93 | 95 | 97 | 95 | 94 |

Here, the value at 100° C. is superior to all others. This condition is not accepted by Wash Fastness and Color Fastness, where it was evaluated less than $3^{rd}$ grade.

6.4. Final Setting Step (FA Step)

The former step was fixed as follows: stabilization 120° C., PS 170° C., dyeing 110° C., and FS temperature range of 130 to 160° C. The results are shown in Table 16.

TABLE 16

The result of the Pre-Setting Process

| Section | | F1 | F2 | F3 | F4 |
|---|---|---|---|---|---|
| Condition | Stabilization [° C.] | | | 120 | |
| | PS [° C.] | | | 170 | |
| | DYE [° C.] | | | 110 | |
| | FS [° C.] | 130 | 140 | 150 | 160 |
| | Extension [%] | 30 | 32 | 33 | 28 |
| | Recovery [%] | 86 | 92 | 97 | 97 |

Resin Treatment

The resin treatment process takes place during the FS step. The conditions for this process are as follows: stabilization 120° C., PS 170° C., dyeing 110° C., and FS 150° C. The main resin is a softening agent: Silsoft AM-2 consisting of a carboxyl functional silicone softener, SF-73K consisting of a silicon emulsion and cationic active surfactant compound, and Deatron AS-20 consisting of an ion active solution. These were compounded with the pick-up ratio of 1 to 5%. The results are represented in Table 17.

TABLE 17

The result of the Resin Treatment Process

| Category | | K1 | | | K2 | | | K3 | | |
|---|---|---|---|---|---|---|---|---|---|---|
| Condition | Pick-Up Ratio [%] | 1 | 3 | 5 | 1 | 3 | 5 | 1 | 3 | 5 |
| | Stabilization [° C.] | | | | | 120 | | | | |
| | PS [° C.] | | | | | 170 | | | | |
| | DYE [° C.] | | | | | 110 | | | | |
| | FS [° C.] | | | | | 150 | | | | |
| | Extension [%] | 34 | 34 | 35 | 33 | 33 | 34 | 32 | 33 | 33 |
| | Recovery [%] | 95 | 92 | 90 | 94 | 93 | 91 | 94 | 92 | 91 |

Here,
K1 hybrid ratio (SF-73K:AS-20 = 2:1)
K2 hybrid ratio (AM-2:AS-20 = 2:1)
K3 hybrid ratio (SF-73K:AS-20 = 3:2)

6.6 Conclusion

The High Shrinkage Yarn had a higher value for CR at atmospheric conditions (20° C., RH70). However, LSCY showed the most superior results under a heated setting (180° C.). In other words, the PTT&PET LSCY had the best results in the yarn's shrinkage ratio and crimp recovery force. The spacer fabric was better than any other fabric (F/W, C/K, T/C, D/R, and D/R pleated fabrics) in the results of functional testing by fabric type. The physical properties compared relatively were tensile/elongation, extension/set, stretchability, thermal conductivity, and air permeability.

The sensitivity of the thermal conductivity of the spacer fabric by AMD hole variation was about twice as much than that of MD hole variation. That is, thermal conductivity by AMD hole variation was much more effective. The spacer fabric had the optimum condition of thermal conductivity, extension, and recovery with the 3 to 5 mm hole range. The results were correlated upwards when the hole shape was in circles instead of ovals.

30 Denier was lower in softness than 20 Denier when a monofilament yarn was used for the pile yarn of the spacer fabric. However, it was outstanding for the elasticity of the fabric. Also, the 2 bar knitted fabric was superior to the 1 bar knitted fabric for initial pile and final pile height after compression recovery. The cross pattern was high as the initial fabric pile height. However, it was confirmed that the semi-cross pattern has a higher pile height and elasticity than others due to its high compression recovery abilities. It was also inferred that the knitted stitch has a distance of 1.15 mm when the side wale was expressed with the best value at the constitution of the cross-sectional relation amongst each other for support and balance. The spacer fabric increases in pile height at initial state through the increasing of machine plate distance. In this research, optimum machine plate distance condition was 8 mm.

The spacer fabric consisting of 30% LSCY yielded the best results during the LSCY ratio comparison testing.

The optimum conditions according to the test results by the finishing process step are as follows. The stabilization step's chamber temperature of 120° C. and width enlargement ratio of 10%, and the PS chamber temperature of 170° C. The dyeing machine's inner temperature of 110° C., and the FS chamber temperature of 150° C. The optimum hybrid ratio of the compounding resin, SF-73K and AS-20, for the resin treatment process was 2:1, and the best pick-up ratio was 1%. The major specification and physical properties of the spacer fabric are in Table 18.

TABLE 18

Working conditions and Physical Properties
Spacer Fabric for the Advanced Car Seat Fabric

| | | | |
|---|---|---|---|
| Working Condition | Yarn | Surface | LSCY300 30% Portion |
| | | Pile | 30D Monofilament |
| | Knitting | Constitution | Semi-cross |
| | | Hole avg. Diameter | 3.75 mm |
| | | M/C Plate Distance | 8 mm |
| | | Fabric count | 30.48 CPI |
| | Finishing | Stabilization | 120° C., 10% enlargement |
| | | Pre-Setting | 170° C. × 20 m/min |
| | | Dyeing | 110° C. |
| | | Final Setting | 150° C. × 20 m/min |
| | | Resin Treatment | K1, 1% Pick-up |
| Physical Property | Stretch | Elongation[%] | 58 |
| | | Extension[%] | 34 |
| | | Recovery[%] | 95 |
| | Cushion | Compression Recovery[%] | 94.3 |
| | Conductivity | Thermal Conductivity[W/mK] | 0.062 |
| | | Air Permeability[cm$^3$/cm$^2$/S] | 149 |
| | etc | Taber Rotary Abrasion[grade] | 4 |
| | | Dye Stability[grade] | 4~5 |
| | | Color Fastness[grade] | 4~5 |

As previously mentioned, the spacer fabric according to the present invention is useful as a car seat fabric.

In addition, the spacer fabric according to the present invention is applicable to a car seat equipped with an actuator and a heating/cooling apparatus inside, due to the advanced flexibility for transferring the actuator moving effect to the body, the increased cushionability for minimizing the hardness of the surface of the device, and the high thermal conductivity for effectively and quickly transferring the heating/cooling effect to the body.

What is claimed is:

1. A spacer fabric with advanced flexibility, cushionability, and thermal conductivity, comprising a top layer and a bottom layer formed by knitting Latent Self Crimping Yarn (LSCY) and Draw Textured Yarn (DTY), and multiple pile yarns formed between the top and bottom layers linking the two layers, wherein:
the LSCY is a side-by-side yarn containing one component or the combination of two components selected from the group consisting of polyethyleneterephthalate (PET), polytrimethyleneterephthalate (PTT), polybutyleneterephthalate (PBT), and nylon;
the DTY is prepared by drawing polyester or nylon filament yarn;
the LSCY and DTY have a diameter of 75 to 400 Denier; and
the pile yarn is a monofilament made of a component selected from the group consisting of polyester, nylon, acryl, metallic yarns, and carbon fibers, and having a diameter of 20 to 50 Denier.

2. The spacer fabric according to claim 1, wherein the LSCY is a side-by-side yarn prepared by conjugated spinning wherein PET is used as a sole component and an orientation restrainer is mixed with only one side of the yarn, or wherein two components having different peculiar viscosity and shrinkage are used.

3. The spacer fabric according to claim 1, wherein the DTY is prepared by drawing polyester pre-oriented yarn (POY), double twisting two or more folds of the obtained drawn yarn at the twist ratio of 10 Z to 50 Z, first heating the twisted yarn at 180 to 200° C., and second heating the first heated yarn at 190 to 210° C.

4. The spacer fabric according to claim 1, wherein the top layer or both of the top and bottom layers have holes with an average hole diameter of 3 to 5 mm and the ratio of machine direction (MD)/across machine direction (AMD) is 1 to 1.5.

5. The spacer fabric according to claim 1, wherein the pile yarn has a semi-cross structure that is knitted by moving 1 wale.

6. The spacer fabric according to claim 5, wherein the pile has a pile structure forming coordinates of 2100112 and 01122110.

7. The spacer fabric according to claim 1, wherein the thickness is 7 to 9 mm.

8. The spacer fabric according to claim 1, wherein the weight ratio between the LSCY and the DTY is 1:0.75 to 2 (LSCY weight:DTY weight).

9. The spacer fabric according to claim 1, wherein the weight ratio between the LSCY, the DTY and the pile yarns is 1:0.75 to 2:0.5 to 1.5 (LSCY weight:DTY weigh:pile yarn weight).

10. A method of preparing a spacer fabric as defined in claim 1, comprising:
forming a top layer and a bottom layer by knitting Latent Self Crimping Yarn (LSCY) and Draw Textured Yarn (DTY), wherein the LSCY is a side-by-side yarn prepared by conjugated spinning using one or two components selected from the group consisting of polyethyleneterephthalate (PET), polytrimethyleneterephthalate (PTT), polybutyleneterephthalate (PBT), and nylon, and has a diameter of 75 to 400 Denier, and the DTY is prepared by drawing polyester or nylon filament yarn and has a diameter of 75 to 400 Denier;
forming multiple pile yarns between the top and bottom layers linking the two layers, wherein the pile yarn is a monofilament made of a component selected from the group consisting of polyester, nylon, acryl, metallic yarns, and carbon fibers, and having a diameter of 20 to 50 Denier; and
performing finishing steps comprising a stabilizing step, a pre-setting step, a dyeing step, a final setting step, and a resin treatment step.

11. The method according to claim 10, wherein the LSCY is a side-by-side yarn prepared by conjugated spinning wherein PET is used as a sole component and an orientation restrainer is mixed with only one side of the yarn, or wherein two components having different peculiar viscosity and shrinkage are used.

12. The method according to claim 10, wherein the DTY is prepared by drawing polyester pre-oriented yarn (POY), double twisting two or more folds of the obtained drawn yarn at the twist ratio of 10 Z to 50 Z, first heating the twisted yarn at 180 to 200° C., and second heating the first heated yarn at 190 to 210° C.

13. The method according to claim 10, wherein the top layer or both of the top and bottom layers have holes with an average hole diameter of 3 to 5 mm and the ratio of machine direction (MD)/across machine direction (AMD) is 1 to 1.5.

14. The method according to claim 10, wherein the pile yarn has a semi-cross structure that is knitted by moving 1 wale.

15. The method according to claim 14, wherein the pile has a pile structure forming coordinates of 21100112 and 01122110.

16. The method according to claim 10, wherein the M/C plate distance is 7 to 9 mm when forming the top and bottom layers.

17. The method according to claim 10, wherein the weight ratio between the LSCY and the DTY is 1:0.75 to 2 (LSCY weight:DTY weight).

18. The method according to claim 10, wherein the weight ratio between the LSCY, the DTY and the pile yarns is 1:0.75 to 2:0.5 to 1.5 (LSCY weight:DTY weight:pile yarn weight).

19. The method according to claim 10, wherein the stabilization step is performed under the conditions of a reaction temperature of 100 to 140° C., an enlargement rate of 15 to 25 m/min, and a fabric width enlargement of 5 to 10 %.

20. The method according to claim 10, wherein the pre-setting step is performed under the conditions of a reaction temperature of 150 to 190° C. and an enlargement rate of 15 to 25 m/min.

21. The method according to claim 10, wherein the dyeing step is performed at 100 to 130° C. for 10 to 60 minutes.

22. The method according to claim 10, wherein the dyeing step is performed by further adding one or more selected from the group consisting of an antistatic agent, a dispersing agent, and a nonflammable agent.

23. The method according to claim 10, wherein the final setting step is performed at 130 to 160° C. and 15 to 25 m/min.

24. The method according to claim 10, wherein the resin treatment step is performed by treating with the resin containing the mixture of a carboxyl functional silicone softener and a silicon emulsion, a cation-based active surfactant compound, and an anion active solution, at the mixture ratio of 1:1 to 3:2.

25. A car seat comprising the spacer fabric as defined in claim 1.

26. The car seat according to claim 25, which is equipped with a moving actuator and a heating/cooling device.

* * * * *

UNITED STATES PATENT AND TRADEMARK OFFICE
CERTIFICATE OF CORRECTION

| | | |
|---|---|---|
| PATENT NO. | : 7,565,821 B2 | Page 1 of 1 |
| APPLICATION NO. | : 11/648945 | |
| DATED | : July 28, 2009 | |
| INVENTOR(S) | : Pyung-Yul Park et al. | |

It is certified that error appears in the above-identified patent and that said Letters Patent is hereby corrected as shown below:

On the cover page, FOREIGN PATENT DOCUMENTS section, delete "A3" and insert --A2--

On the cover page, Item (74), Attorney, Agent, or Firm, delete "Onellp" and insert --Onello--

Column 25, line 42, delete "2100112" and insert --21100112--

Column 25, line 51, delete "weigh" and insert --weight--

Signed and Sealed this

Tenth Day of November, 2009

David J. Kappos
*Director of the United States Patent and Trademark Office*